US012561918B2

(12) United States Patent
Lal et al.

(10) Patent No.: US 12,561,918 B2
(45) Date of Patent: Feb. 24, 2026

(54) METHODS FOR ENHANCED PRESENTATION AND COLLABORATION USING AR HMDS

(71) Applicant: Adeia Guides Inc., San Jose, CA (US)

(72) Inventors: Dhananjay Lal, Englewood, CO (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 107 days.

(21) Appl. No.: 18/496,528

(22) Filed: Oct. 27, 2023

(65) Prior Publication Data

US 2025/0139909 A1 May 1, 2025

(51) Int. Cl.
*G06T 19/00* (2011.01)
*G06F 3/01* (2006.01)

(52) U.S. Cl.
CPC ............ *G06T 19/006* (2013.01); *G06F 3/013* (2013.01); *G06T 2219/024* (2013.01)

(58) Field of Classification Search
CPC . G06T 19/006; G06T 2219/024; G06F 3/013; G06F 3/011
See application file for complete search history.

(56) References Cited

U.S. PATENT DOCUMENTS

| | | | |
|---|---|---|---|
| 8,994,721 | B2 | 3/2015 | Matsuda |
| 9,066,154 | B2 | 6/2015 | Simpson et al. |
| 9,100,464 | B2 | 8/2015 | Dasher et al. |
| 9,374,549 | B2 | 6/2016 | Cho |
| 9,632,648 | B2 | 4/2017 | Lee et al. |
| 9,716,861 | B1 | 7/2017 | Poel et al. |
| 9,830,680 | B2 | 11/2017 | Meuninck et al. |
| 9,996,150 | B2 | 6/2018 | Swaminathan et al. |
| 10,289,290 | B2 | 5/2019 | Gil |

(Continued)

FOREIGN PATENT DOCUMENTS

| | | | |
|---|---|---|---|
| CN | 116501279 | A | 7/2023 |
| EP | 3667455 | A1 | 6/2020 |

(Continued)

OTHER PUBLICATIONS

International Search Report and Written Opinion of PCT/US2023/085672 dated May 6, 2024.

(Continued)

*Primary Examiner* — Jeffery A Brier
(74) *Attorney, Agent, or Firm* — HG LAW LLP

(57) ABSTRACT

A first virtual display zone may be set as anchored in a first physical space. The zone may include one or more virtual displays rendered by extended reality (XR) equipment, such as a head mounted display (HMD). A first zone policy may be set for the first virtual display zone, defining what applications will have outputs rendered in the first virtual zone. A zone policy may specify that the output of applications that provide live communication will be generated for display in the first virtual display, or may specify which other XR devices, in the first physical space or remote, may access the virtual displays of the first. Location and policies for a second virtual display zone may be similarly set. Also, virtual displays anchored in the physical space may be de-anchored and re-anchored to the XR equipment if the XR equipment exits the first physical space.

20 Claims, 23 Drawing Sheets

(56) References Cited

U.S. PATENT DOCUMENTS

| | | | |
|---|---|---|---|
| 10,440,416 | B1 | 10/2019 | Phillips et al. |
| 10,453,263 | B2 | 10/2019 | Khalid et al. |
| 10,528,210 | B2 | 1/2020 | Reeves et al. |
| 10,591,730 | B2 | 3/2020 | Rodriguez |
| 10,754,496 | B2 | 8/2020 | Kiemele et al. |
| 10,871,934 | B2 | 12/2020 | Paulovich et al. |
| 10,922,892 | B1 | 2/2021 | Bhushan et al. |
| 11,082,679 | B1 | 8/2021 | Swift et al. |
| 11,086,392 | B1 | 8/2021 | Sztuk et al. |
| 11,200,869 | B1 | 12/2021 | Post et al. |
| 11,385,775 | B2 | 7/2022 | Singh et al. |
| 11,386,611 | B2 | 7/2022 | Newman et al. |
| 11,630,509 | B2 | 4/2023 | Lee et al. |
| 11,816,494 | B2 | 11/2023 | Huang |
| 11,979,630 | B2 | 5/2024 | Sharma et al. |
| 2008/0115081 | A1 | 5/2008 | Sankaravadivelu et al. |
| 2010/0211872 | A1 | 8/2010 | Rolston et al. |
| 2010/0251292 | A1 | 9/2010 | Srinivasan et al. |
| 2011/0164175 | A1 | 7/2011 | Chung et al. |
| 2012/0154557 | A1 | 6/2012 | Perez et al. |
| 2012/0304092 | A1 | 11/2012 | Jarrett et al. |
| 2013/0027613 | A1 | 1/2013 | Kim et al. |
| 2013/0031582 | A1 | 1/2013 | Tinsman et al. |
| 2013/0036442 | A1 | 2/2013 | Wingert |
| 2013/0173765 | A1 | 7/2013 | Korbecki |
| 2014/0029913 | A1 | 1/2014 | Lopez et al. |
| 2014/0068692 | A1 | 3/2014 | Archibong et al. |
| 2014/0168262 | A1 | 6/2014 | Forutanpour et al. |
| 2014/0223490 | A1 | 8/2014 | Pan et al. |
| 2014/0282272 | A1 | 9/2014 | Kies et al. |
| 2014/0351729 | A1 | 11/2014 | Park |
| 2015/0007225 | A1 | 1/2015 | Strong |
| 2015/0312561 | A1* | 10/2015 | Hoof ................ H04N 21/41407 348/46 |
| 2015/0317062 | A1 | 11/2015 | Jarrett et al. |
| 2016/0034155 | A1 | 2/2016 | Vranjes et al. |
| 2016/0054791 | A1 | 2/2016 | Mullins et al. |
| 2016/0267712 | A1 | 9/2016 | Nartker et al. |
| 2017/0185276 | A1 | 6/2017 | Lee et al. |
| 2017/0201808 | A1 | 7/2017 | Chowdhary et al. |
| 2017/0256096 | A1 | 9/2017 | Faaborg et al. |
| 2018/0070113 | A1 | 3/2018 | Phillips et al. |
| 2018/0173323 | A1* | 6/2018 | Harvey ................... G06F 3/011 |
| 2018/0204362 | A1 | 7/2018 | Tinsman |
| 2018/0376205 | A1 | 12/2018 | Oswal et al. |
| 2019/0065026 | A1 | 2/2019 | Kiemele et al. |
| 2019/0146219 | A1 | 5/2019 | Rodriguez |
| 2019/0279407 | A1 | 9/2019 | Mchugh et al. |
| 2019/0356939 | A1 | 11/2019 | Kuo |
| 2020/0035003 | A1 | 1/2020 | Canberk et al. |
| 2020/0111232 | A1 | 4/2020 | Bleyer et al. |
| 2021/0037279 | A1 | 2/2021 | Moran et al. |
| 2021/0072877 | A1 | 3/2021 | Kim et al. |
| 2021/0152876 | A1 | 5/2021 | Feng |
| 2021/0383115 | A1 | 12/2021 | Alon et al. |
| 2021/0397000 | A1 | 12/2021 | Rodriguez |
| 2022/0092860 | A1* | 3/2022 | Clark .................... G06F 3/0346 |
| 2022/0100265 | A1 | 3/2022 | Kies et al. |
| 2022/0229534 | A1 | 7/2022 | Terre et al. |
| 2022/0244903 | A1* | 8/2022 | Taylor ................... G06F 3/0481 |
| 2022/0253093 | A1 | 8/2022 | Berliner et al. |
| 2022/0253125 | A1 | 8/2022 | Wallen et al. |
| 2022/0292785 | A1 | 9/2022 | Jayaram et al. |
| 2022/0295040 | A1 | 9/2022 | Jayaram et al. |
| 2022/0326967 | A1 | 10/2022 | Khan et al. |
| 2022/0334649 | A1 | 10/2022 | Hwang et al. |
| 2022/0334695 | A1 | 10/2022 | Singh et al. |
| 2022/0392170 | A1 | 12/2022 | Singh |
| 2023/0031023 | A1 | 2/2023 | Wang et al. |
| 2023/0067584 | A1 | 3/2023 | Zhou |
| 2023/0095339 | A1 | 3/2023 | Cleland-Huang et al. |
| 2023/0137920 | A1 | 5/2023 | Klein et al. |
| 2023/0171456 | A1 | 6/2023 | Sharma et al. |
| 2023/0186528 | A1 | 6/2023 | Eluvan et al. |
| 2023/0237752 | A1* | 7/2023 | Elhadad ............. G02B 27/0172 345/419 |
| 2023/0260240 | A1 | 8/2023 | Jayaram et al. |
| 2024/0005613 | A1* | 1/2024 | Leyton ............... G02B 27/0172 |
| 2024/0211090 | A1 | 6/2024 | Dasher et al. |
| 2024/0244285 | A1 | 7/2024 | Gurgul et al. |
| 2024/0248544 | A1 | 7/2024 | Liu |
| 2024/0361833 | A1 | 10/2024 | Calderone et al. |
| 2024/0430501 | A1 | 12/2024 | Phillips |
| 2025/0104361 | A1 | 3/2025 | Phillips et al. |
| 2025/0138695 | A1 | 5/2025 | Lal et al. |
| 2025/0159275 | A1 | 5/2025 | Phillips et al. |

FOREIGN PATENT DOCUMENTS

| | | | |
|---|---|---|---|
| EP | 3539087 | B1 | 11/2022 |
| WO | 2017/102636 | A1 | 6/2017 |
| WO | 2018/090060 | A1 | 5/2018 |
| WO | 2022/103741 | A1 | 5/2022 |

OTHER PUBLICATIONS

Monica Chin, "I used the world's first augmented reality laptop" (May 18, 2023)(https://www.theverge.com/23727583/spacetop-augmented-reality-laptop-release-hands-on), (5 pages).

Munson, Ben , "AT&T and Magic Leap will let you watch 4 shows at a time", Munson, Ben, "AT&T and Magic Leap will let you watch 4 shows at a time," StreamTV Insider, (Oct. 10, 2018).

Mcgill et al., "Expanding the Bounds of Seated Virtual Workspaces", ACM Transactions on Computer-Human Interaction, ACM, New York, NY, US, vol. 27, No. 3, May 31, 2020, pp. 1-40.

U.S. Appl. No. 18/214,119, filed Jun. 26, 2023, Christopher Phillips.

U.S. Appl. No. 18/088,067, filed Dec. 23, 2022, Charles Dasher.

U.S. Appl. No. 18/505,937, filed Nov. 9, 2023, Christopher Phillips.

U.S. Appl. No. 18/371,254, filed Sep. 21, 2023, Christopher Phillips.

U.S. Appl. No. 18/496,515, filed Oct. 27, 2023, Dhananjay Lal.

* cited by examiner

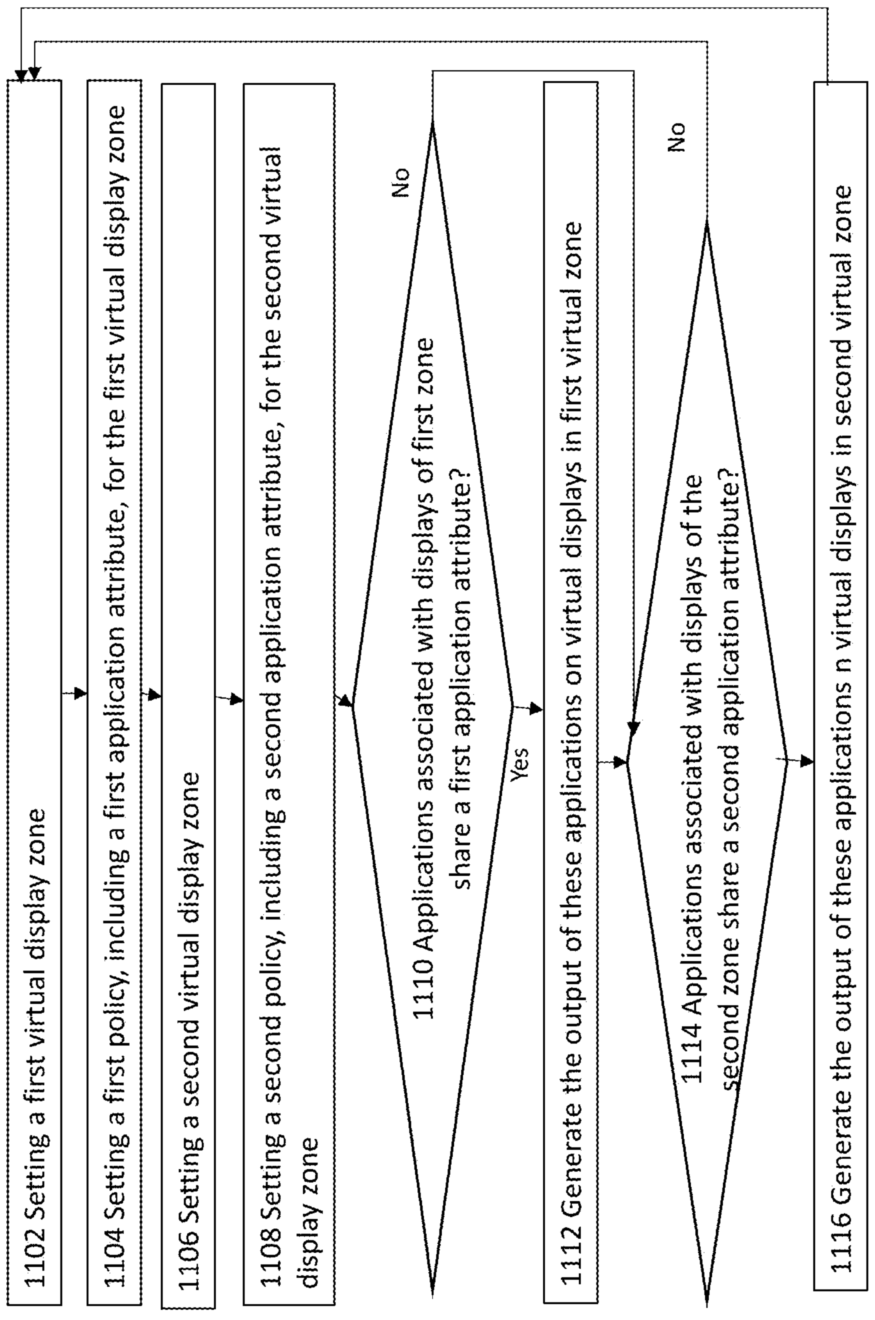

1102 Setting a first virtual display zone

1104 Setting a first policy, including a first application attribute, for the first virtual display zone 1106 Setting a second virtual display zone 1108 Setting a second policy, including a second application attribute, for the second virtual display zone 1110 Applications associated with displays of first zone share a first application attribute?    No    Yes 1112 Generate the output of these applications on virtual displays in first virtual zone 1114 Applications associated with displays of the second zone share a second application attribute?    No 1116 Generate the output of these applications n virtual displays in second virtual zone 1218 Does the first zone policy enable transmission to the second XR equipment?

No

Yes

1220 Generate output for virtual displays of the first zone to the second XR equipment 1222 Does the second zone policy enable transmission to the second XR equipment?

No

Yes

1224 Generate output for virtual displays of the second zone to the second XR equipment Go to 1202

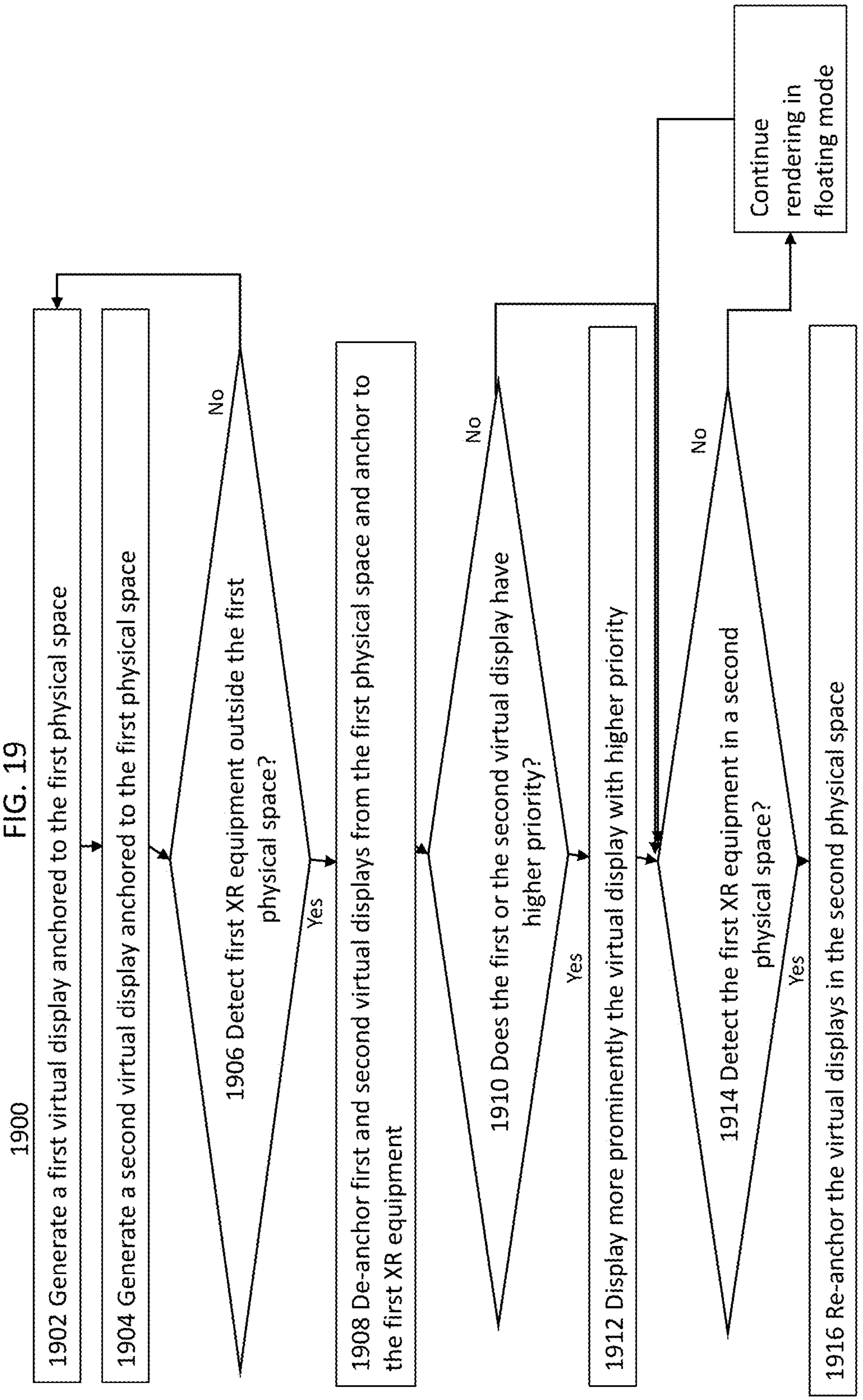

1902 Generate a first virtual display anchored to the first physical space

1904 Generate a second virtual display anchored to the first physical space

1906 Detect first XR equipment outside the first physical space?

No

Yes

1908 De-anchor first and second virtual displays from the first physical space and anchor to the first XR equipment 1910 Does the first or the second virtual display have higher priority?

No

Yes

1912 Display more prominently the virtual display with higher priority

1914 Detect the first XR equipment in a second physical space?

No

Yes

1916 Re-anchor the virtual displays in the second physical space

Continue rendering in floating mode

METHODS FOR ENHANCED PRESENTATION AND COLLABORATION USING AR HMDS

BACKGROUND

The present disclosure relates to extended reality (XR) windows and other displays, for example, augmented reality (AR) displays and, in particular, relates to organizing, bundling, repositioning, moving and providing access to such virtual displays.

SUMMARY

To increase display surface viewing areas, virtual displays may be used to extend a viewing area of a physical display. More than one application or instance of an application may be needed by users of physical displays at any given time and users may need or desire to view and to interact with each such application or instance of an application. XR equipment, such as a head mounted displays (HMDs), smart glasses, and the like, may then be used for viewing such displays, while one or more physical displays may be controlled using physical controllers of a computing device, such as a keyboard, trackpad, mouse, or using other physical controllers such as a joystick or other gaming console controls, TV/household appliance remote control, handheld device, or the like, or combination thereof, or using a combination of gestures or handheld controllers of the XR equipment.

A technological problem is that virtual windows and other displays may be positioned in the physical space haphazardly or inconsistently. When an application whose output had been displayed on a virtual window is re-opened, it may be helpful to provide the output in the same area, and proximate to other virtual displays associated with applications that share a common attribute. In a related vein, it may be difficult to bundle together automatically a group of virtual displays, to share the group with another device or user, to send them to another location in the same physical space or to another physical space, or to grant or to deny access for viewing by other XR equipment. Further, when groups of related virtual displays are shared with another user, or are seen at another computing device of the original user, it would be helpful to keep together automatically each group of virtual displays.

Another technological problem is that when virtual displays are positioned such that they are spatially anchored with respect to a first physical space in which the XR equipment is initially located, but the XR equipment moves out of the first physical space, the XR equipment may no longer have a view of the virtual displays. Such movement of the physical display 111 may be determined using cameras of the XR HMD 868, for example, if the XR HMD is part of a Simultaneous Localization And Mapping (SLAM) system, or by other means. Also, when the XR equipment enters a second physical space, additional steps may have to be taken to re-establish the virtual displays such that they are anchored in the second physical space based on user configurations by positioning them as appropriate or convenient.

According to an aspect of the disclosure, a virtual display zone may be created in which the outputs of applications sharing an attribute are positioned to be seen via XR equipment, such as an HMD, as virtual displays in respective virtual display zones. For example, a first virtual display zone may be anchored to a computing device in a physical space and may contain one or more virtual windows of outputs of applications related to a particular functionality or to a related group of functionalities, such as video calls, meetings and other audio communications. A second virtual display zone may be anchored to the same or different location in the physical space or to a physical object in the physical space, and may contain one or more windows generated based on outputs of applications produced by a developer or other source or group of sources, sold by a particular vendor or group of vendors, or licensed by a particular licensor or subscription.

A policy may be set for a virtual display zone to control the positioning of virtual displays showing the output of applications that share a first attribute. For example, a policy may be set to specify that an application that provides video conferencing will be flagged so that when it is launched its output is shown on a virtual display in a first virtual display zone. The policy may also control which other XR HMDs in the physical space can view the virtual displays of the virtual display zone, with which devices remote from the first physical space the virtual displays of the virtual display zone are shared, the size and positioning of the virtual displays of the virtual display zone, the audio volume of the virtual displays of the virtual zone, and the like.

In addition, when it is detected that the XR equipment has moved from the original physical space where the virtual display or displays are anchored, one or more virtual displays may de-anchor from the location in the physical space and anchor instead to the XR HMD such that they are seen by the XR HMD to continue to be located in front of the XR HMD. In this way, the XR HMD user may continue to use the virtual displays as the user moves. A policy for a given virtual zone may specify that upon detecting of the XR equipment exiting the first physical space, virtual displays of a specified virtual display zone may de-anchor from the location in the physical space and anchor instead to the XR HMD such that they are seen by the XR HMD to continue to be located in front of the XR HMD. A most recently active, or a most frequently used virtual display may be positioned or otherwise made more prominent as the XR HMD moves.

A technological solution that may be provided by one or more aspects of the present disclosure is that related virtual displays together may be conveniently organized, positioned, re-positioned, shared with other XR equipment or given access to in the same physical space, shared with users remote from the physical space, moved around, kept track of, labeled, and set policies for as a group. Many virtual displays may be created in a physical space and an XR HMD wearing user may hear video conferencing application generating audio but momentarily the user may forget where to find the video conferencing application. If the user remembers that the virtual display zone for virtual applications based on communications applications is always kept in a particular area of the room, then the user can look there and find the video conferencing applications-based virtual window. Also, the virtual display zone may be moved or repositioned as a whole, together with its virtual displays. Also, the virtual display zone may be repositioned with respect to the physical object, re-anchored to a second physical object instead of the first physical object, re-anchored to a computing device that is running the application generating output data for the virtual displays of the zone, instead of to the first physical object. Anchored in this way, the virtual displays of the zone may move or reorient in response to movement or repositioning of the computing device.

A method, system, non-transitory computer-readable medium, and means for implementing the method are disclosed for controlling virtual display zones. A first virtual display zone may be set having a first location in a first physical space, the first location being anchored with respect to a first anchoring location in the first physical space. For example, the first anchoring location may be a physical object in the first physical space.

A second virtual display zone may be set at a second location in the first physical space that is different from the first location, the second location being anchored with respect to a second anchoring location in the physical space. The first and second anchoring locations may be the same location. A first user input may be received for setting a first zone policy for the first virtual display zone. The zone policy may define a first application attribute. Similarly, a second user input may be received for setting a second zone policy for the second virtual display zone. The second zone policy may define a second application attribute different from the first application attribute.

If it is determined that one or more first applications share the first application attribute, and that one or more second applications share the second application attribute, then the the first virtual display zone is rendered by a first extended reality (XR) equipment to include the first virtual displays of the zone. That is, the one or more first virtual displays are generated based on the one or more first applications running on a computing device, and for the second virtual display zone, the one or more second virtual displays are generated based on the one or more second applications.

The first application attribute may be related to functionality provided by the one or more first applications. Upon launch of an application sharing the first application attribute, a first virtual display generated based on the launched application may be automatically positioned in the first virtual display zone. Or, the first application attribute may be related to a provider source of the one or more applications, and wherein, in response to a launched application sharing the first application attribute, a first virtual display generated based on the launched application is automatically positioned in the first virtual display zone.

The physical object to which a virtual display zone is anchored may be a computing device on which the one or more first applications and the one or more second applications are running. A virtual display zone may be spatially anchored to a location in a physical space. A virtual display zone may be anchored in a first location in a first physical space and, if the computing device is moved to a second physical space, the virtual display zone containing the same virtual displays, for example, showing the output of the same applications running on the computing device, may be automatically anchored in a second location in the second physical space, if the virtual zone was previously mapped in the second location in the second physical space. By way of illustration, a virtual display zone containing virtual application windows showing outputs of applications running on the computing device may be anchored in a first location in a living room, and when the computing device is moved to the office the virtual display zone and its included virtual displays may be anchored to a second location in the office. Or, the virtual display zone may be anchored to a location in a first physical space, but if the computing device is moved to a second physical space, the virtual display zone may become automatically re-anchored with respect to the computing device. For example, if the computing device is moved to a new physical space where the virtual display zone is not mapped to a location in the new physical space, then the virtual display zone may be automatically anchored with respect to the computing device. In response to further repositioning of the computing device in a previous physical space, the virtual display zone with its virtual displays may be re-anchored automatically the same way as before in that physical space. Virtual display zones may then be moved, re-positioned and re-anchored as desired in a physical space. The virtual application windows showing in a virtual display zone at any given time may be determined by which applications are currently active on the computing device. Also, the applications may be running on a server connected to the computing device.

In response to a detection of a change of user gaze of a user wearing the first XR equipment, the first location of the first virtual display zone and the second location of the second virtual display zone may remain unchanged. In response to a detection of a change of user gaze of a user wearing the first XR equipment, the first location of the first virtual display zone and the second location of the second virtual display zone may be changed according to the changed user gaze. In response to the detection of the user gaze aligning with the one or more first virtual displays of the first virtual display zone, the first virtual display zone may be rendered more prominently than the second virtual display zone.

The virtual display zones may also be rendered remotely. Data for generating the one or more first virtual displays may be transmitted to a remote device in a second physical space remote from the first physical space, so that the first virtual display zone in the second physical space may be rendered simultaneously with, or instead of, being rendered in the first physical space. Also, data for generating the one or more first virtual displays may be transmitted to a remote device in a second physical space remote from the first physical space. Then a second XR equipment may render the one or more first displays in a third virtual display zone anchored to a second object in the second physical space. The third virtual display zone may be defined by its own zone policies. For example, a sharing policy may enable generating for display, by a second XR equipment located in the first physical space, the first virtual display zone, including display of the one or more first virtual displays. Or, the sharing policy may prevent display by the second XR equipment of the second virtual display zone, including display of any of the one or more second virtual displays. A policy may also define that a virtual display of the one or more second virtual displays is displayed more prominently than displays of the first virtual display zone.

Also, first and second virtual display zones may be set anchored with respect to respective locations in the first physical space, and zone sharing/access policies may be set for each zone. A second XR equipment may access, or may be denied access to, virtual displays of one or more of the display zone pursuant the sharing/access policies set for each zone. The second XR device may be located in the same physical space or may access the virtual displays in a remote location. The sharing policy may specify that the second XR equipment may access the virtual displays of the zone but have no permission to re-share them with a third XR device located remotely, and/or have no permission to re-share them with a third XR device located in the same physical space as the second XR equipment.

Also contemplated is a method, system, non-transitory computer-readable medium, and means for implementing the method are disclosed for anchoring virtual displays in physical space and floating them in relation to XR equipment. Such a floating mode, also known as a nomadic mode, may entail de-anchoring the virtual displays from their locations in the physical space and eventually re-anchoring to another fixed location when certain conditions are met. A first virtual display is viewable on a first XR equipment, such that the first virtual display is anchored in a first physical space. In this way, a position of the first virtual display relative to the first location may remain unchanged in response to movement of the first XR equipment within the first physical space. But in response to detecting the first XR equipment moving away from the first physical space or outside the first physical space:

- de-anchoring the first virtual display from the first physical space, and instead
- anchoring the first virtual display to a location in the field of view of the XR equipment such that the first virtual display moves automatically. For example, the location in the field of view of the XR equipment may be such that the first virtual display appears at eye level at the 1 o'clock position 0.3-1.5 m ahead of the XR equipment, and this position may be maintained as the XR equipment moves.

If a second virtual display viewable on the first XR equipment is also generated anchored in the first physical space, then in response to detecting presence of the first XR equipment moving away from the first physical space or outside the first physical space, the second virtual display also may be de-anchored from the first physical space and re-anchored to the XR equipment such that the second virtual display moves automatically in response to movement of the first XR equipment. If it is determined that the first virtual display has priority over the second virtual display, then the first virtual display may be displayed more prominently than the second virtual display while the first XR equipment is outside the first physical space. For example, priority may be determined if the application associated with the virtual display had more recent user interaction than did a second application associated with the second virtual display. Or priority may be determined if more frequent user interaction with a first application associated with the first virtual display is determined than user interaction with a second application associated with the second virtual display. A more prominent display may entail displaying the first virtual display at eye level or in the foreground with respect to the head mounted display.

If a second physical space is reached, then the first virtual display may be rendered such that the first virtual display is re-anchored to the second physical space, so that after it is re-anchored in the second physical space a position of the first virtual display remains unchanged in response to movement of the first XR equipment within the second physical space. The second physical space may be separate and distinct from the first physical space. The second physical space may be a space in which locations for presenting virtual displays have been previously saved by the system, such that the first virtual display is re-anchored by default in the previously saved location.

If a second XR equipment is detected in the second physical space, it may or may not be granted access for rendering one or more of the virtual displays. For example, in response to the determining that the second XR equipment has interacted with content associated with an application whose output is generated for display as the first virtual display, for example, an application that is shared between the user wearing the first XR equipment and the user wearing the second XR equipment, then the second XR equipment may be granted access to the first virtual display.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 illustrates a process for virtual display zone control based on an application attribute, according to an aspect of the disclosure;

FIG. 19 illustrates a process for virtual display control, including de-anchoring, re-anchoring to XR equipment, and re-anchoring virtual displays, according to an aspect of the disclosure;

DETAILED DESCRIPTION

Figure 1:
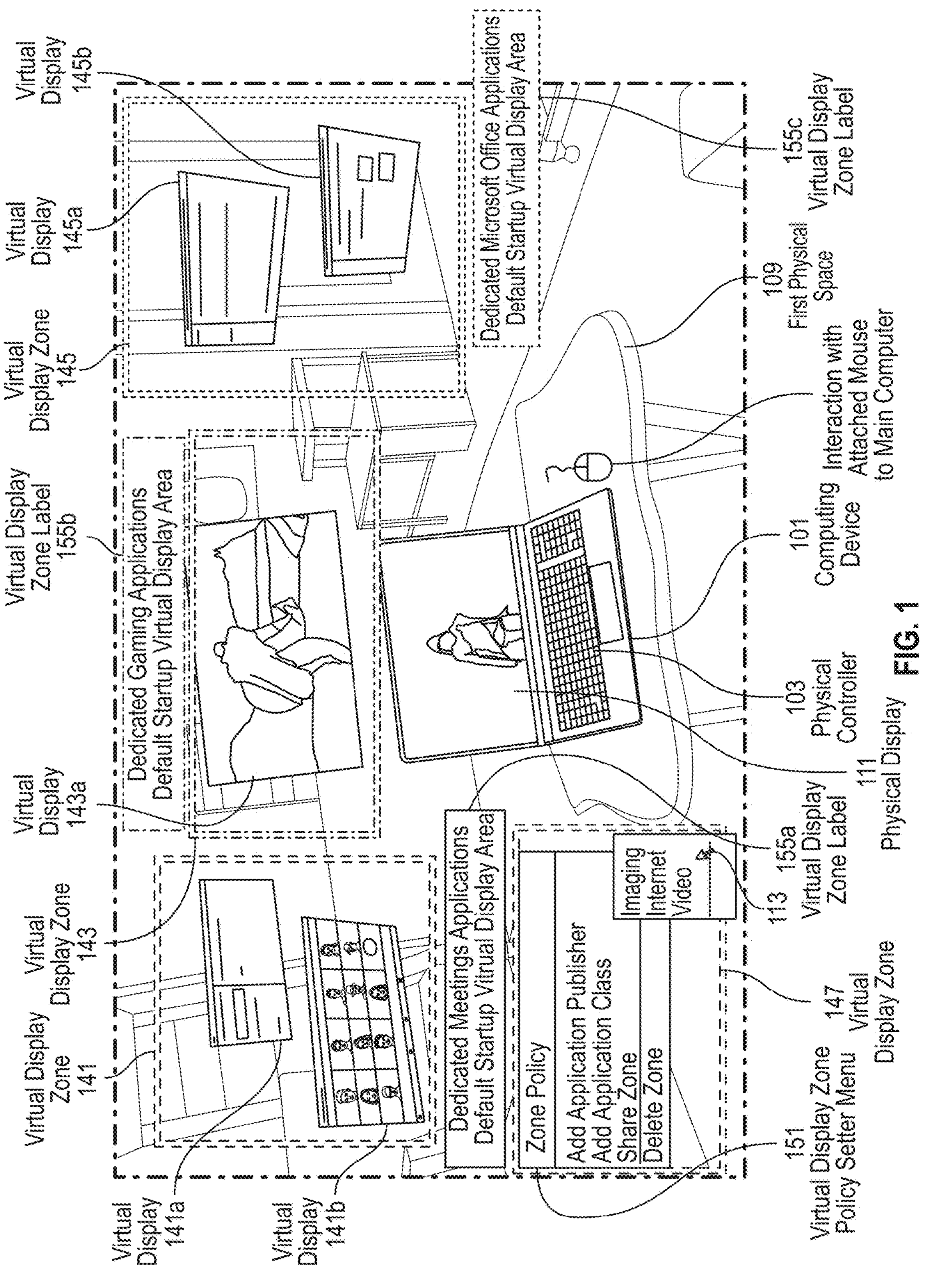
FIG. 1 illustrates an example of a computing device, including an integrated physical keyboard (physical controller) and a physical laptop monitor (physical display), and three virtual display zones, as a well as a fourth virtual display zone being set up, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

References herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). The terms AR and MR may sometimes be used interchangeable with XR herein. An XR device may take the form of glasses or a headset in some instances (e.g., a head-mounted display or HMD). While some references are made to a VR device or devices, appreciate that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein. In some embodiments, the described XR or VR devices may include see-through capabilities enabling the display of some or all of a user's real-world environment. Sometimes various types of XR equipment may be referred to as a HMD. For example, the XR device may include optical see-through (OST) capability in which light passes through the display, providing "through the glass" visibility of an environment. In an embodiment, the XR device may include video see-through (VST) capability, wherein cameras (e.g., mounted on or within the XR device) capture images or video of the user's environment and render a corresponding video, allowing the user to view, in whole or in part, his or her real-world environment by way of the video.

The term "virtual display" may include a display perceptible by an XR device, such as an AR or MR device. In some embodiments, the device may be any suitable XR device configured to display virtual objects within a scene including any suitable combination of a real-world environment, a virtual environment, and/or virtual objects. It may be determined whether the XR device is connected to Wi-Fi and the Internet. If it is not connected to a network, then network connectivity is obtained. In an embodiment, the XR devices are connected using the same Wi-Fi network to facilitate integrated use.

FIG. 1 illustrates an example of virtual display zones 141, 143, 145, each containing one or more virtual application windows or virtual displays. A first virtual display zone 141 contains two virtual displays 141*a*, 141*b*, a second virtual display zone 143 contains one virtual displays 143*a*, and a third virtual display zone 145 contains two virtual displays 145*a*, 145*b*. Also shown in FIG. 1 is a fourth virtual display zone 147 for which zone policy is being set via a virtual display zone policy setter menu 151. A computing device 101 is illustrated as having a physical controller 103 and a physical display 111. Computing device 101 may be used to generate and to control the virtual display zones, their policies, and to provide output of applications running on the computing device for display of the virtual displays via XR HMDs in the virtual display zones.

Four virtual display zones are shown, but it will be understood that more or fewer virtual display zones may be generated and controlled. Virtual display zones may overlap each other and/or overlap physical display 111 so as to provide larger viewing areas. FIG. 1 shows that virtual display zones 141, 143, 145 may be positioned along a vertical plane anchored to a point in the physical space or to a physical object in the physical space. The virtual displays of each virtual display zone may be anchored to a parent anchor, that is, to a region or zone in the physical space or to an object therein. For example, the virtual display zone may be anchored to a table or to a chair such that movement of the table or chair, including a change of orientation of the table or chair, causes similar movement of the virtual windows. The zone may have its own coordinates in space and anchor all, or a subset, of the virtual windows. A virtual display may include more than one virtual application window and/or other GUI widget. In an embodiment, virtual display zones may be anchored to the computing device to allow the position of the virtual displays of the zone to change as a user changes the position of the laptop. Since the XR controller is aware of the laptop's physical display position, updating the laptop's physical display position auto-updates the position of the parent anchor, and thus updates the position of the virtual displays. In a further embodiment, virtual displays and virtual windows may be anchored to the XR HMD 868. The term "virtual display" may sometimes be used herein and throughout the present application to refer to a virtual window and/or a virtual panel and/or virtual monitor in addition to, or instead of, a virtual display.

Policies set for one or more of the virtual display zones 141, 143, 145 may specify that virtual application windows of the given virtual display zone are anchored with respect to the computing device 101 such that movement of the computing device 101, including a change in orientation of the computing device 101, causes a comparable change in the virtual application windows of the given virtual display zone. The virtual display zones 151, 143, 145 may be positioned along an arc, or substantial arc, which may be the same arc or substantial arc along which physical display 111 is positioned. Each virtual display zone may be individually and separately thus anchored. In addition, one or more of virtual display zones 141, 143 and 145 may be slightly tilted relative to the vertical plane or relative to the arc so that viewing by a user at physical controller 103 may be facilitated. The system may at time of virtual display generation automatically position the virtual application windows of each virtual display zone, and/or the position the virtual display zones, along such an arc or vertical plane.

As also shown in FIG. 1, the virtual application windows may be displaying output of different applications, or different instances of the same application. Or, two or more virtual displays within a virtual display zone (or within two or more virtual display zones) may display output of the same application, for example, different portions of a window output by the same application. Physical controller 101 of computing device 103 may control physical display 111. The applications whose outputs are provided on virtual displays may be run locally on the computing device 101. The applications may be running in the cloud or on another device and the computing device 101 may be interacting with both the application and the output of the application being displayed on a virtual display. Physical display 111 may be formed integrally with computing device 101 or may be connected via wired or wireless connection thereto.

Computing device 101 may be connected directly via wired or wireless connection to extended reality head mounted display (XR HMD) for viewing virtual displays or virtual application windows. Computing device 101 may be connected via server, such as a local area network (LAN) server or via the Internet to the XR HMD, or to a controller device for the XR HMD, and may provide output of applications necessary for generating virtual application windows associated with virtual display zones to which the XR HMD has been given access. While one XR HMD is sometimes referred, to it will be understood that more than one XR HMD may be provided. Virtual application windows of a virtual display zone 141, 143, 145 may be viewable by one or more XR HMDs. For example, more than one user may simultaneously use the system shown in FIG. 1 if they are physically located in the same physical space and virtual zone display policy specifies that the XR HMD is to be given access to the virtual application windows of the zone. An XR HMD may render virtual application windows in just those virtual display zones to which the XR HMD has been given access according to the policies set for the respective virtual display zone. The XR HMD may also provide audio output as part of the experience also provided by the relevant virtual application windows(s) to which the XR HMD has been given access according to the policies set for the respective virtual display zone.

In one embodiment, virtual extended displays or the virtual display zones may be automatically positioned in relation to the physical computing device (e.g., laptop). As additional virtual displays or virtual display zones are added, the arrangement of virtual displays and virtual application windows may automatically change within the zone according to policies of the zone. For example, virtual display zone policy may specify that a virtual display associated with a telephone application always interrupts other virtual displays of the virtual display zone or is always displayed more prominently, for example at eye level, with respect to the XR HMD, within the virtual display zone. In an embodiment, the size or color of the virtual display or the virtual display zone as a whole that is given focus by the movement of the cursor may change to indicate that it is the one with focus. A virtual display or virtual display zone with which the physical controller 103 is interacting may be automatically moved to a central location to align with the physical display 111 or may be made larger. The position of the cursor may also be rendered by the XR HMD.

As shown in FIG. 1, policies may be set separately for each virtual display zone. Policies set for a first virtual display zone may specify that virtual displays of the zone are anchored to the same physical object in the physical space, and contain one or more windows of outputs of applications related to a specific business, organization or field of endeavor, place of work, or school. With such a policy in place, applications that are opened on the computing device may by default have their outputs transmitted to the XR HMD to be visible in the first virtual display zone 141. Various policies may be pre-populated and offered on menus seen via a physical display 111 of the computing device or via the XR HMD. These pre-populated policy options may be selected as needed by a user or may be set as default policies.

Policies set for a second virtual display zone may specify that the virtual displays of the zone are anchored to the same or another physical object in the physical space as those of the first virtual display zone, and a further policy may set forth that the second virtual display zone will contain one or more windows of outputs of applications that are shared with or by another user or with or by another XR equipment in the same physical space or in a remote physical space. For example, virtual display zone policy may dictate that virtual displays of the second displays zone contain one or more virtual windows of outputs of applications to which a second XR equipment has been given access or to which the second XR equipment has been denied access. Policies set for a third virtual display zone may specify that virtual displays of the third virtual display zone comprise outputs of applications running on a computing device that are displayed both in the physical space (for example, in an office or vehicle) and in a remote physical space (for example, a home). In this way, upon detection of the computing device in a respective physical space, the virtual displays of the third virtual display zone are made visible via the HMD. Policies set for a fourth virtual display zone may specify that virtual displays of the virtual display zone are anchored to a computing device such that the displays of the fourth virtual display zone move and/or change orientations in response to movement and/or change in orientation of the computing device. Policies set for a fifth virtual display zone may specify that virtual displays of the fifth virtual display zone are those that are transmitted and shared from a remote device. For example, a user may wish to create a zone to which one or more co-workers may transmit virtual displays. In this way, content for a virtual display received from any user, or from a specified list of users set according to the zone policy, would be displayed as virtual displays in the fifth zone. One or more such policies may be set for individual virtual displays. For example, a policy for a virtual display may be set to share the virtual display with another XR device present in the same physical space, and/or a policy for the virtual display may be set to share the virtual display with an XR device present in a physical space remote from the first physical space.

As further detailed in FIG. 1, each virtual display zone may, depending on zone policy set for the virtual display zone, display a virtual display zone label 155*a*, 155*b*, 155*c* during the set up and/or the policy setting process, or may display the zone label by default always or whenever any virtual display of the zone is active. Each virtual display zone label may indicate the application attribute that the virtual displays of the zone share. For example, virtual display zone label 155A for virtual display zone 141 indicates that the zone includes virtual displays for video and other live meetings. The computing device 101 would thus transmit to the XR device for rendering as being seen in the zone the output of video conferencing, telephone and other such applications. Each virtual zone may be delineated by borders, may be displays in one or more different colors, may be shaped in different ways or otherwise distinguished from other virtual display zones.

User gaze may be detected and a virtual display zone may be made more prominent in response to determining that a user gaze is directed to the virtual display zone, and/or a virtual display within a zone may be made more prominent in response. For example, the virtual display zone for communications applications virtual displays may be made more prominent, for example, can change color or be made to appear more bold, flashing or the like. In an embodiment, in addition or instead, the virtual display that is active may be made more prominent, or may be made even more prominent than its virtual display zone as a whole, in response to determination of user gaze on the virtual display.

In an embodiment, a virtual display zone 141, 143, 145 may be set as active depending on the gaze of the user using the XR HMD. The computing device 101 may control the application(s) associated with the virtual display zone of focus. Inputs to physical controller 103 of the computing device are thus applied to the application(s) associated with virtual display 121. The system may limit cursor movement, as driven by mouse, trackpad or joystick signals, in the GUI of virtual display 121. In an embodiment, moving the cursor to a different display may be done in response to a mouse/trackpad/joystick signal in combination with another key signal, for example, a tab key, windows key or CTRL key signal. At time T2, a user gaze is detected by XR HMD glasses as being oriented toward virtual display zone 145, and thus one or more virtual displays of the virtual display zone 145 is/are set as the display(s) of focus. The most recent cursor position of virtual display may be recalled and resumed on the virtual display at this time. Inputs to physical controller 103 of the computing device are thus applied to the application associated with virtual display(s) of the virtual display zone. In an embodiment, XR HMD controls, such as handheld XR controllers, speech input to a microphone of the XR HMD, and the like, may also be applied to the application associated with virtual display(s) of the virtual display zone.

In an embodiment, a finer grain gaze detection may be provided, so that the system may determine to which virtual display of the virtual display zone the user's gaze is directed. The application associated with that virtual display may be set as active to which user input received will be directed. Also, the entire virtual display may be made more prominent, for example, may be moved to a more central location with respect to the computing device, may be rendered in bolder colors, may have better contrast or sharper image quality, or the like. It will be understood that other methods for selecting the active display and/or the active application may be provided instead of, or in addition to, a gaze detection method. For example, the user may direct the cursor to designate the active virtual display zone and/or the active virtual display. In addition, or instead, the user may use hand gestures detected by the camera or cameras of the XR HMD 868.

In an embodiment, if two or more XR equipment, such as two HMDs, are simultaneously detected to be on in the vicinity of the system, that is, in the same first physical space, the direction of user gaze may be determined separately for each HMD. In this way, one HMD may be paired with a first virtual display zone, and/or with a virtual window within the first virtual display zone, while a second HMD may be simultaneously paired with a second virtual display zone and/or a virtual display therein. The first display at which a first user's gaze is detected would be active and user input entered on a first physical controller would be processed accordingly using an application with output rendered on the paired physical display zone. A second virtual display zone or virtual display at which the second user's gaze is detected may also be active and user input entered on a second computing device, would be processed by a second application and be rendered accordingly.

Figure 2:
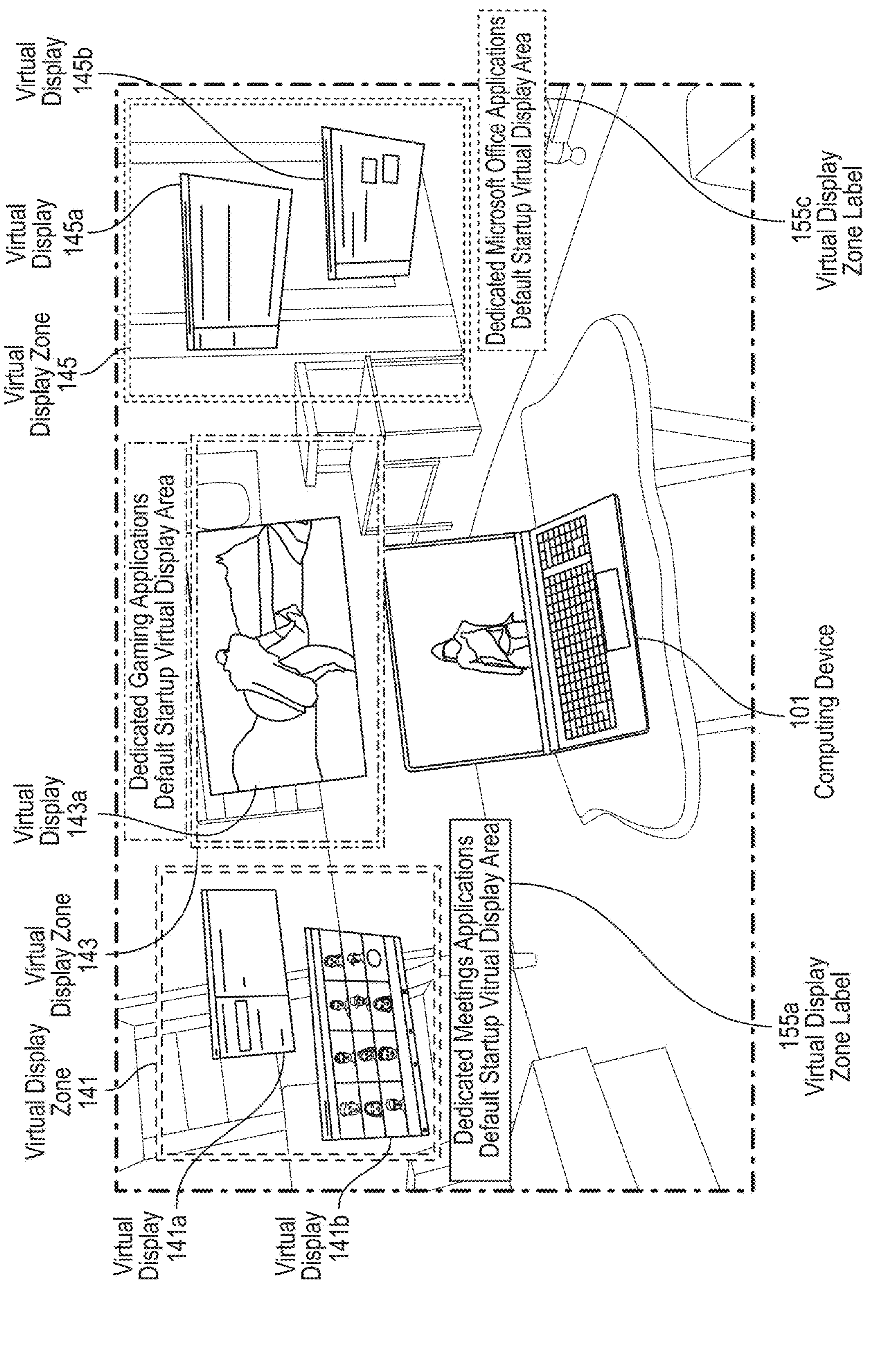
FIG. 2 illustrates an example with three virtual display zones that may be rendered on right and left eye displays of an XR HMD or other XR equipment, according to an aspect of the disclosure.

FIG. 2 shows three virtual display zones 141, 143 and 145, each with one or more respective virtual displays. As seen in FIG. 2, the second virtual display zone 143 is not as tall as the first and third virtual display zones 141 from 145 because it currently includes only one virtual display 143*a*. The size, including height and width, of the virtual display zone may be set as part of the zone set up process, may change automatically according to how many virtual displays are active therein, or depending on the policy set for the zone, the size may be fixed regardless of how many virtual displays are currently active therein.

Figure 3:
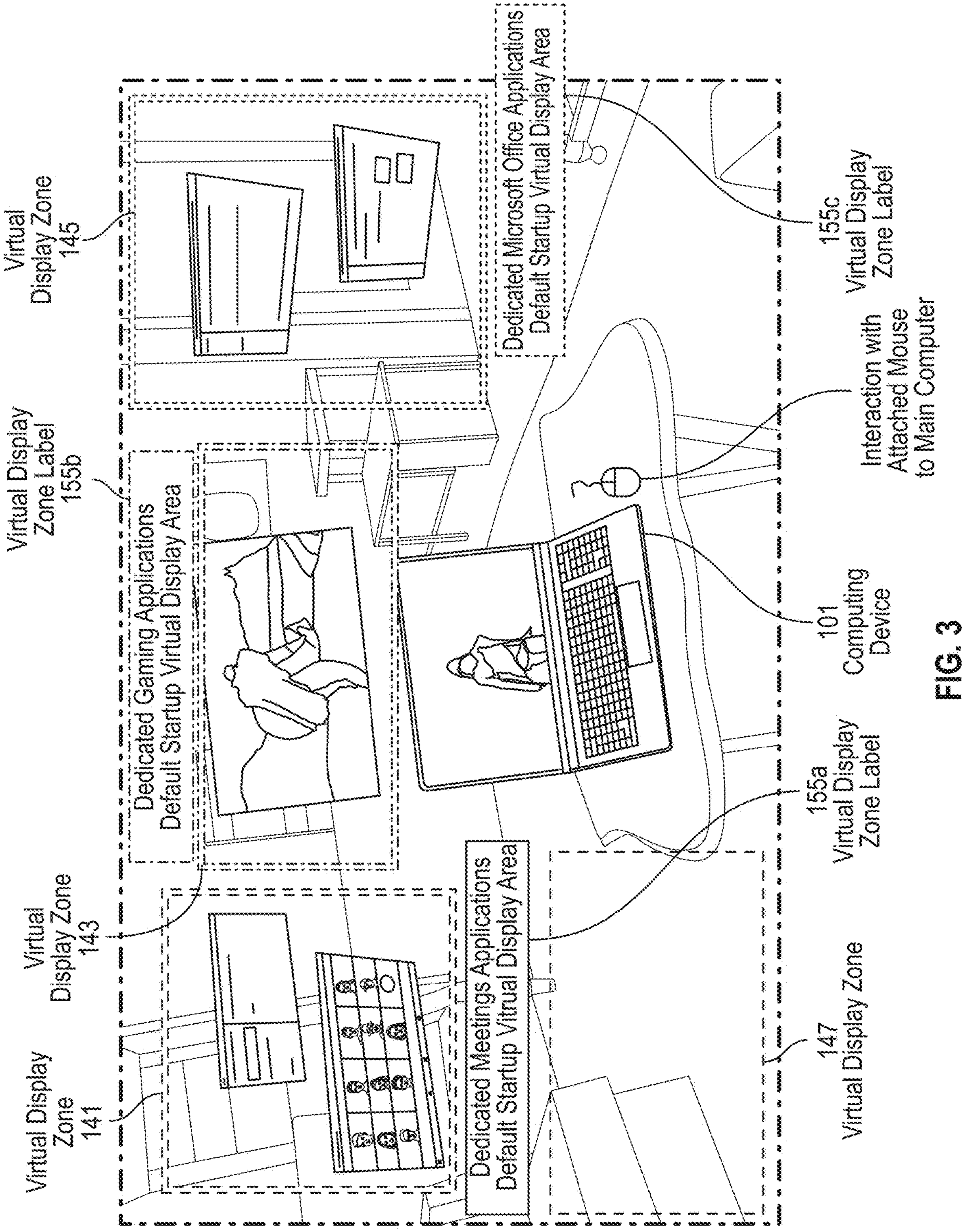
FIG. 3 illustrates the three virtual display zones, as a well as the fourth virtual display zone being initially define, according to an aspect of the disclosure.

FIG. 3 illustrates that a fourth virtual display zone 147 is being generated, for example, through computing device 101. Virtual display zone 147 may also be generated using controls of the XR HMD.

Figure 4:
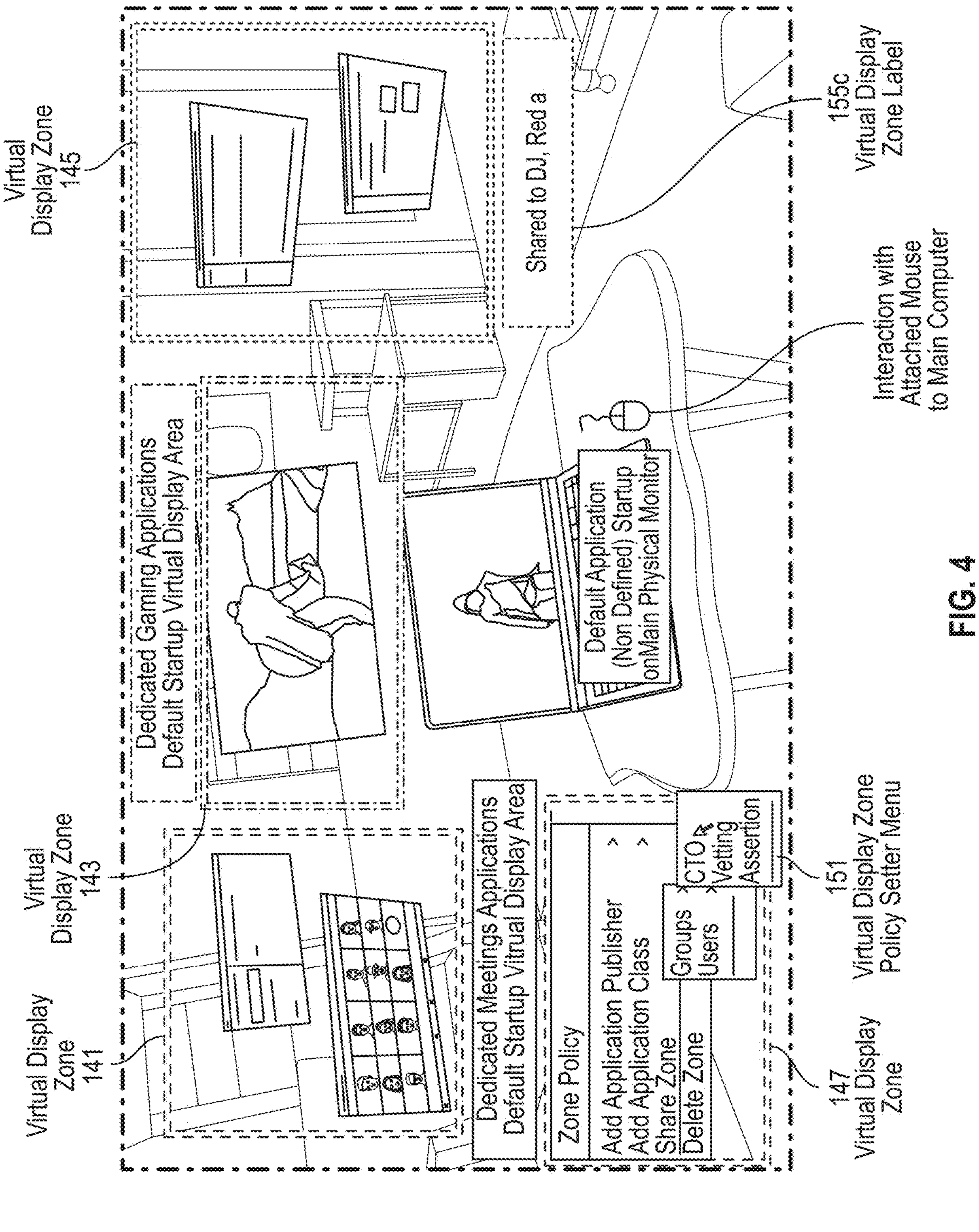
FIG. 4 illustrates the three virtual display zones and policies for the fourth virtual display zone being selected, according to an aspect of the disclosure.

As seen in FIG. 4, a virtual display zone label 155*a* has been generated for the first virtual display zone 141. These virtual displays labels 155 may be automatically generated after policies specifying the common application attribute have been selected for virtual displays of this zone. In this case, the zone policy has been set as featuring by default virtual displays for video applications, for example, streaming videos. The system may automatically generate the virtual display zone label 155 according to the policy set for the zone. Or, the virtual display zone label 155 may be manually input for the zone.

FIG. 4 shows also that default policy setting menu 151 may be detailed and pre-populated. For example, groups such as "CTO" and "Vetting" to which the user belongs may be automatically pre-populated and suggested to user. The zone may be shared with groups of users: when an XR HMD associated with a user who is a member of the group is detected in the physical space or when such a user creates a corresponding virtual display in a remote physical space, the output of an associated application may be transmitted thereto.

Figure 5A:
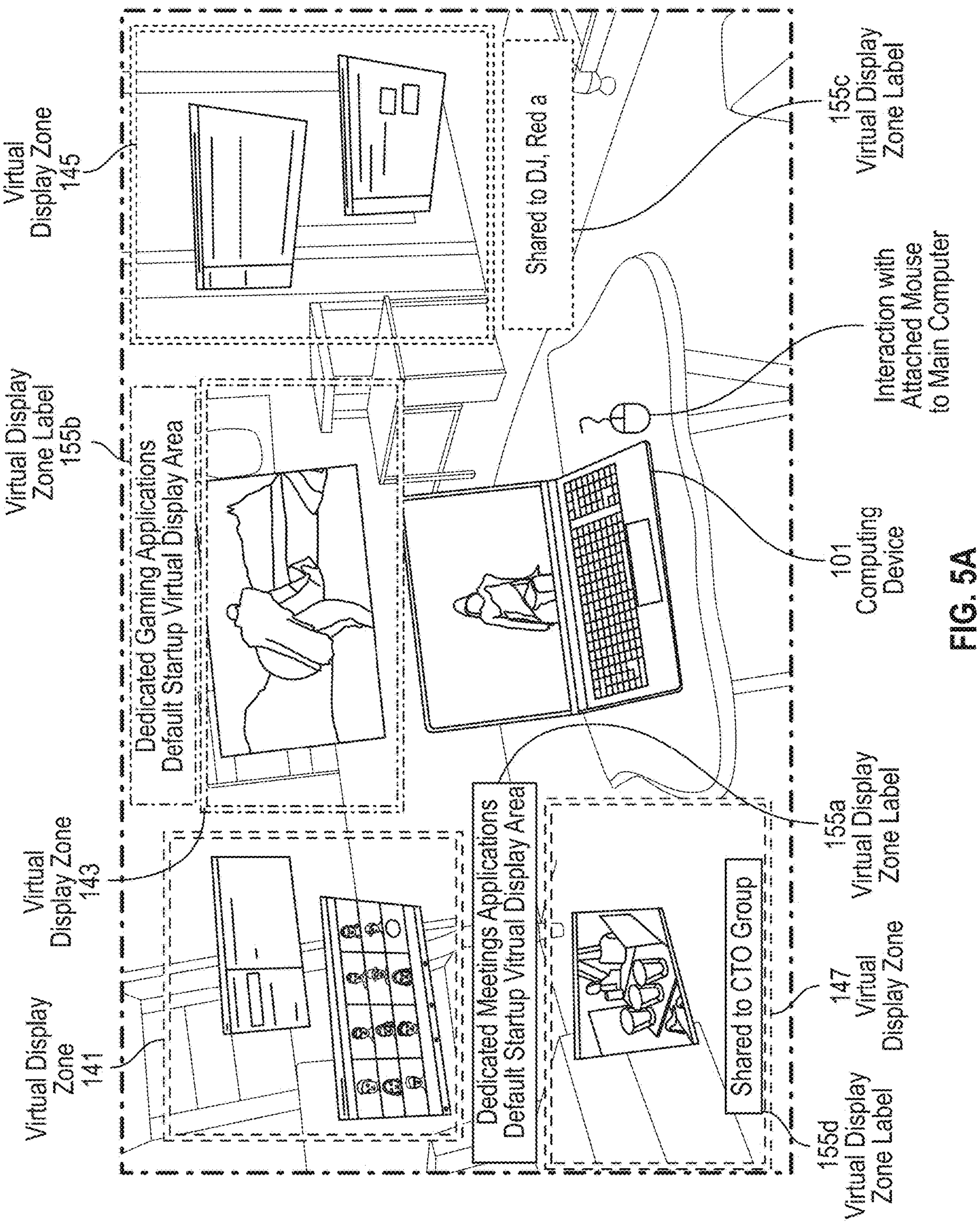
FIG. 5A illustrates the four set up virtual display zones, according to an aspect of the disclosure.

FIG. 5A illustrates that the virtual display zone label may also display additional information about the zone. For example, virtual display zone label 155*c* shows that the zone is being shared by other users. This may indicate that the policy for the virtual zone 145 has specified that users DJ and Reda may access the virtual displays of the virtual display zone 145. Users DJ and Redamay be currently present in the physical space and wearing XR HD or maybe remote from the physical space and accessing the virtual displays of the virtual display zone 145 from their remote locations. The virtual display zone 145 may appear in substantially the same way to those users DJ and Reda, whether they are in the physical space or are remote from the physical space, as the virtual display zone 145 appears in the physical space to the first user.

The zone label may also indicate whether those other users are currently active in their remote spaces and have activated one or more of the applications that provide the virtual displays in the virtual display zone 145. For example, a gaze of user DJ located in a second physical space remote from the first physical space may have been determined to be in the direction of a virtual display shared by the virtual display zone 145 shown in FIG. 5, or the second physical space used by user DJ may have a virtual display zone identical to the virtual display zone 145 because the user in the first physical space may have set as a policy for the virtual display zone 145 specifying that the virtual display zone 145 is to be shared with user DJ. Accordingly, the computing device 101 may transmit output of applications that are seen as virtual displays 145*a*, 145*b* also to a remote XR device used by user DJ. A user may choose with which other user, or other users, to share content (e.g., spatial screens, apps). Further, content sharing may be set with time constraints (e.g., access only when the first XR HMD of the user who created or shared the zone or the virtual display is accessing, access only for a set time period, for example, 1-48 hours, etc.) and/or with share restrictions (e.g., view only, view and edit, etc.). Sharing can be done via the local LAN or via the cloud where updated content can be pushed to all open instances of the application.

Figure 5B:
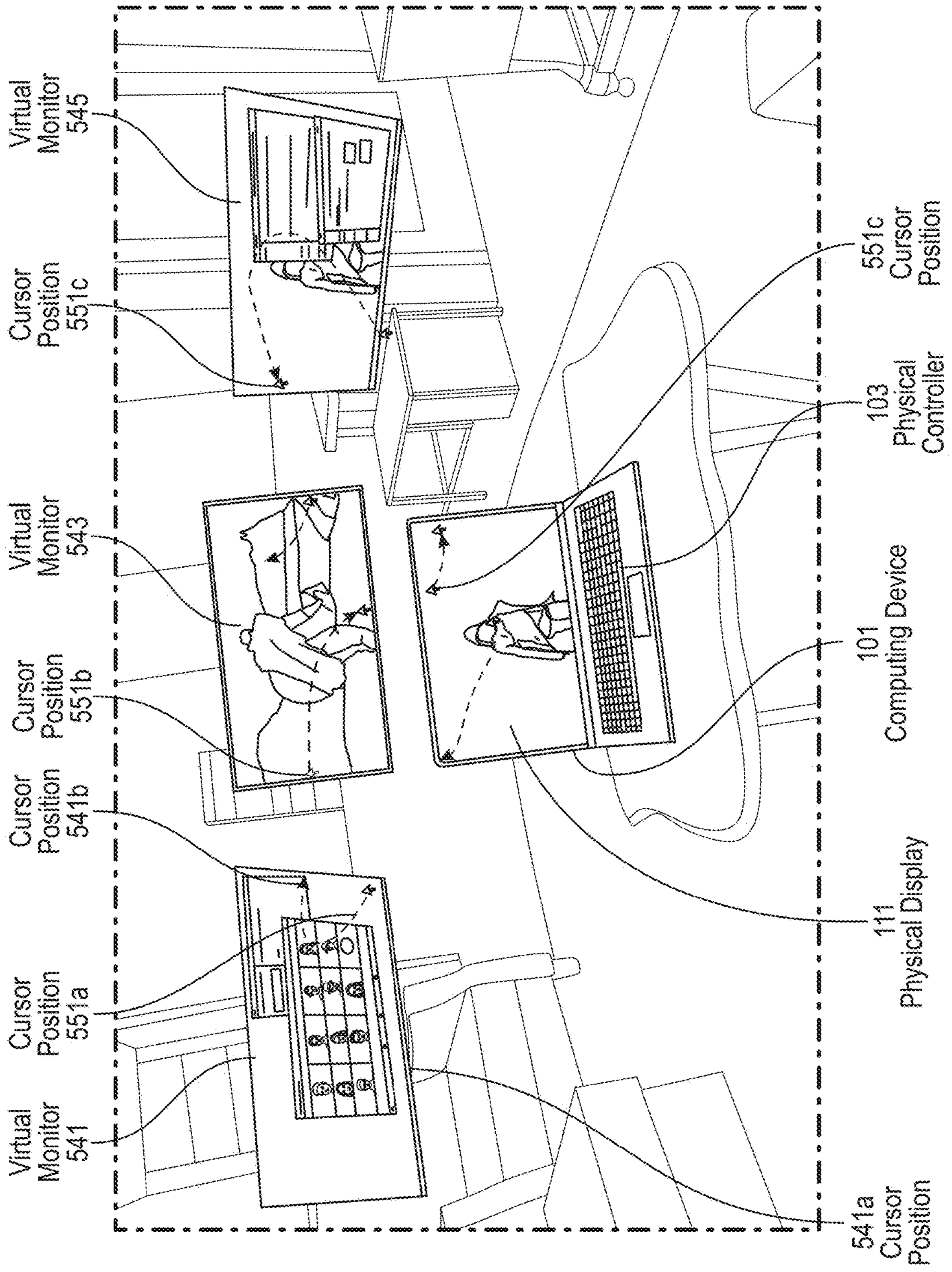
FIG. 5B illustrates virtual display monitors, according to an aspect of the disclosure.

FIG. 5B illustrates virtual monitors 541, 543, 545, which may be spatially anchored to computing device 101. Virtual monitors 541, 543, 545 move in response to movement of the computing device 101, including to a change in orientation of the computing device 101 to maintain the same spatial relationship with the computing device 101. Virtual monitor 541 may include one or more virtual application windows 541*a*, 541*b*. Each virtual monitor 541, 543, 545 may have policies configurable by a user, for example, via inputs to physical controller 103. Such policies may govern what applications' outputs are shown in each respective virtual monitor, just as policies do for virtual display zones shown in FIGS. 1-5A.

In an embodiment, XR equipment renders the virtual displays but does not render the surrounding physical space, while XR equipment renders the virtual display zones as well as the surrounding physical space. Thus, a cursor 551 shown in virtual monitor 541 at cursor position 551*a* would disappear if dragged beyond the boundary of virtual monitor 541 but then reappear immediately at cursor position 551*b* of virtual monitor 543, as shown in FIG. 5B. Then, if dragged below the boundary of virtual monitor 543, the cursor 551 would reappear at cursor position 551 of physical display 111. Thus the cursor would always be displayed on a monitor, virtual or physical. By way of contrast, virtual application windows may be positioned inside or outside virtual display zones and a cursor dragged out of a virtual display zone may be visible in the virtual space in between (outside of) virtual display zones and virtual application windows.

Figure 6:
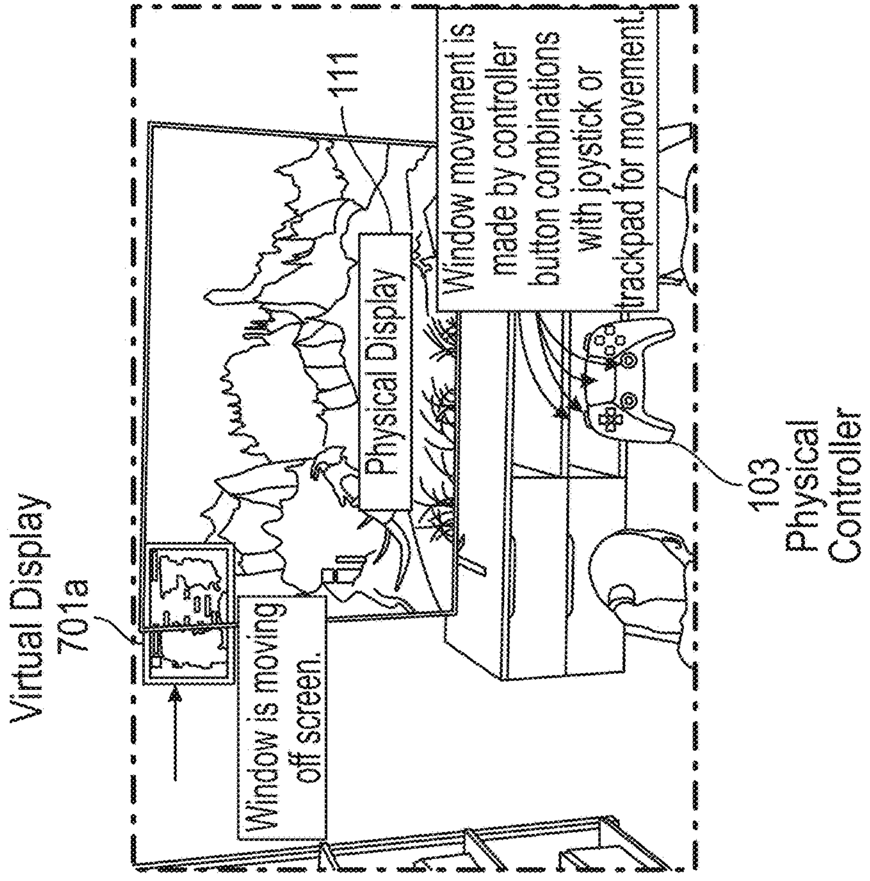
FIGS. 6-7 illustrate an example of a game controller as a physical controller for a physical display as well as the generation of a virtual display, according to an aspect of the disclosure.
Figure 7:
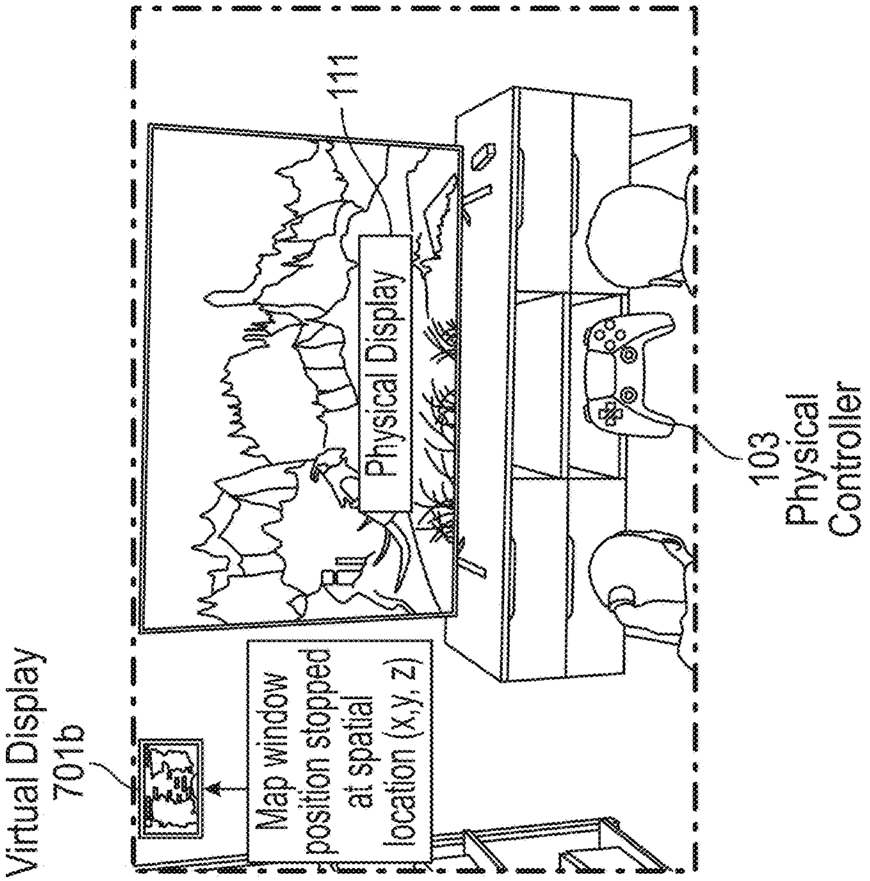

FIGS. 6 and 7 illustrate that computing device 101, physical controller 103 and physical display may be configured as a game console connected to a flatscreen display TV and game controllers. Also, a window or other type of graphic panel 701*a*, shown in FIG. 6, may be dragged off to create a virtual display 701*b*, shown in FIG. 7, which may be contained in a virtual display zone. Policies for the virtual display and/or the virtual display zone may then be set, as described herein.

Figure 8:
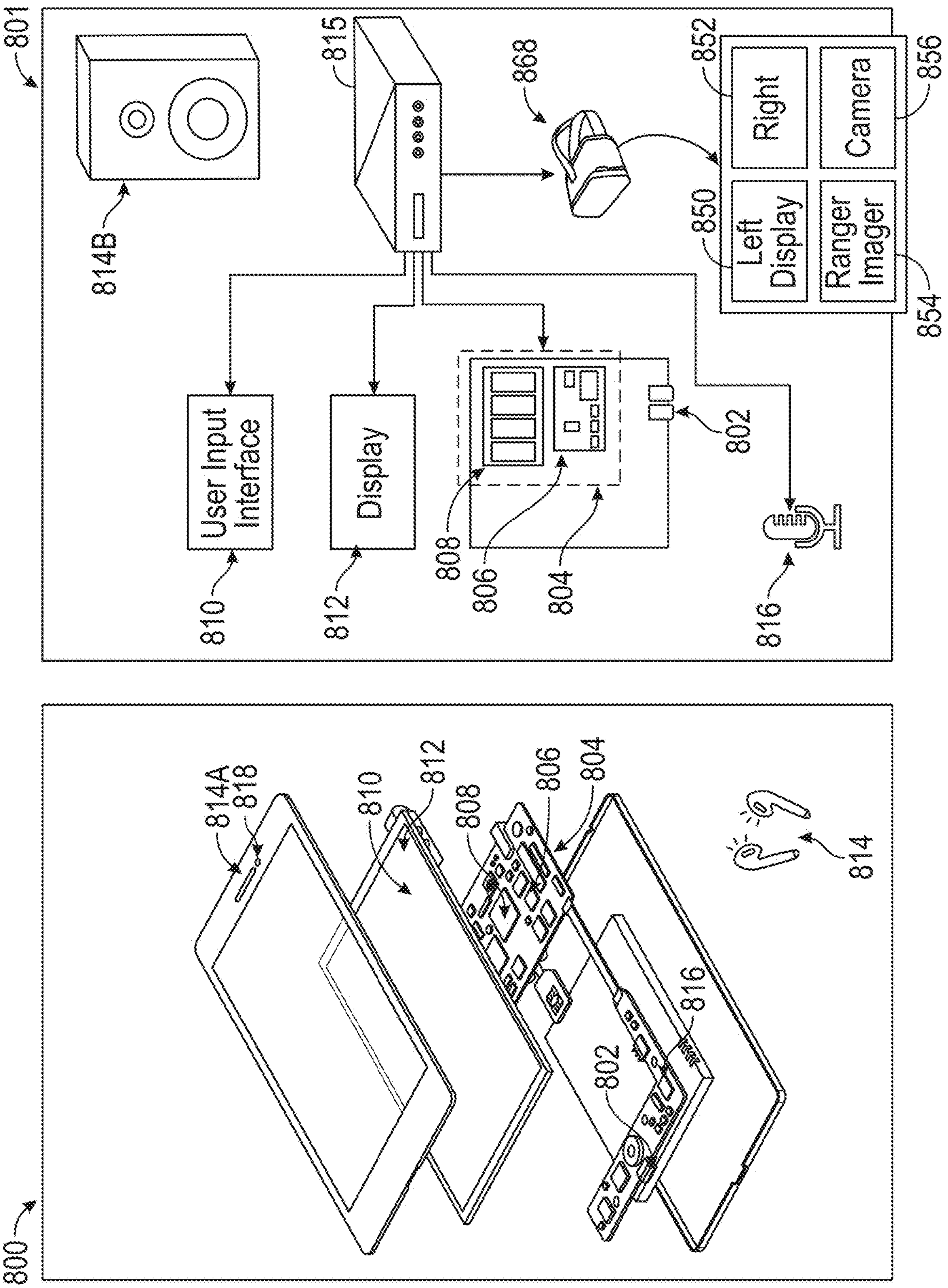
FIG. 8 illustrates a computer system for implement methods described herein, according to an aspect of the disclosure.

FIG. 8 illustrates an example of an implementation of the computing device 101, including some components thereof, a physical display 812 and the XR HMD 868. A circuit board may include control circuitry, processing circuitry, and storage (e.g., RAM, ROM, hard disk, removable disk, etc.). In some embodiments, the circuit board may include an input/output path for communicating with the HMD 868 of the XR HMD 868 and/or with XR HMD controller 1021 as a remote device. Each device 800/801 may receive content and data via input/output (I/O) path 802 that may comprise I/O circuitry (e.g., network card, or wireless transceiver). I/O path 802 may communicate over a local area network (LAN) or wide area network (WAN), for example, via Wi-Fi, Bluetooth, cellular or other wireless or wired connection. Each device 800/801 may include speaker 814A/814B, microphone 816 and camera 818.

Control circuitry 804 may comprise processing circuitry 820 and storage 822 and may comprise I/O circuitry. Control circuitry 804 may be used to send and receive commands, requests, and other suitable data using I/O path, which may comprise I/O circuitry, for example, for receiving user inputs setting up virtual display zones and their locations, selecting or otherwise specifying policies for virtual display zones and for transmitting displays to be provided by the HMD of the XR HMD controller. I/O path may connect control circuitry 804 (and specifically processing circuitry) to one or more communications paths (described below). I/O functions may be provided by one or more of these communications paths, but are sometimes shown as a single path to avoid overcomplicating the drawing.

Control circuitry 804 may be based on any suitable control circuitry such as processing circuitry 820. As referred to herein, control circuitry should be understood to mean circuitry based on one or more microprocessors 806, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 804 executes instructions for various applications, including the XR application, stored in memory (e.g., storage 822). Specifically, control circuitry 804 may be instructed by the XR application to perform the functions discussed above and below. In some implementations, processing or actions performed by control circuitry may be based on instructions received from the XR application.

In client/server-based embodiments, control circuitry 804 may include communications circuitry suitable for communicating with other networks. The XR application may be implemented as software or as a set of executable instructions. The instructions for performing any of the embodiments discussed herein may be encoded on non-transitory computer-readable media (e.g., a hard drive, random-access memory on a DRAM integrated circuit, read-only memory etc.). For example, the instructions may be stored in storage 808, and executed by control circuitry 804 of a device 800.

In some embodiments, the XR HMD controller may be a client residing on device 800, and a server application may reside on the computing device. Control circuitry 804 may include communications circuitry suitable for communicating with a server, XR equipment controller 1021 and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 822 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 822 may be used to store various types of content described herein. Nonvolatile memory may also be used (e.g., to launch a boot-up routine and other instructions).

Control circuitry 804 may include video generating circuitry and tuning circuitry. Control circuitry 804 may also include scaler circuitry for upconverting and down converting content into the preferred output format of equipment 800. Control circuitry 804 may also include digital-to-analog converter circuitry and analog-to-digital converter circuitry for converting between digital and analog signals. In some embodiments all elements of system 800 may be inside housing of the XR display device 868. In some embodiments, XR HMD display device 868 comprises a camera 856 (or a camera array or LiDAR-Light Detection and Ranging). Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 856 may be dirtied at outside physical environment (e.g., two cameras may be pointed out to capture to parallax views of the physical environment). In some embodiments, XR HMD 868 may comprise one or more biometric sensor or sensors to measure eye rotation (e.g., electrodes to measure eye muscle contractions) and head movement. HMD 868 may also comprise range image 854 (e.g., LASER or LIDAR) for computing distance of devices by bouncing the light of the objects and measuring delay in return (e.g., using cameras 856). In some embodiments, HMD 868 comprises left display 850, right display 852 (or both) for generating VST images.

The XR HMD controller 1021 may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from the edge service network, from an out-of-band feed, from an Internet resource, or using another suitable approach). Control circuitry 804 may retrieve instructions of the application from storage 808 and process the instructions to provide XR generation functionality and perform any of the actions discussed herein. Based on the processed instructions, control circuitry 804 may determine what action to perform when input is received from user input interface 810. For example, head movement or movement of a hand or handheld device via user input interface 810. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application may be downloaded and interpreted or otherwise run by an interpreter or virtual machine (run by control circuitry 804). In some embodiments, the XR application may be encoded in the ETV Binary Interchange Format (EBIF), received by control circuitry 804 as part of a suitable feed, and interpreted by a user agent running on control circuitry 804. For example, the XR application may be an EBIF application. In some embodiments, the XR application may be defined by a series of JAVA-based files that are received and run by a local virtual machine or other suitable middleware executed by control circuitry 804. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 602-11x, etc.), or other short-range communication via wired or wireless paths. The user equipment devices may also communicate with each other directly through an indirect path via communication network.

Although communications paths are not always drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network. In an embodiment, a trackpad or mouse, not shown may be used to control movement of a cursor 113 (as shown, for example, in FIG. 1) between physical display 111, virtual displays and virtual zones. Then, physical controller 103 would control the application associated with whichever virtual display to which the cursor has been moved.

The position of each virtual display zone may be determined according to where the user initially positions it. A position of an virtual display zone relative to a computing device 101 may be manually set. In an embodiment, virtual display zones may be positioned and automatically repositioned.

Figure 9:
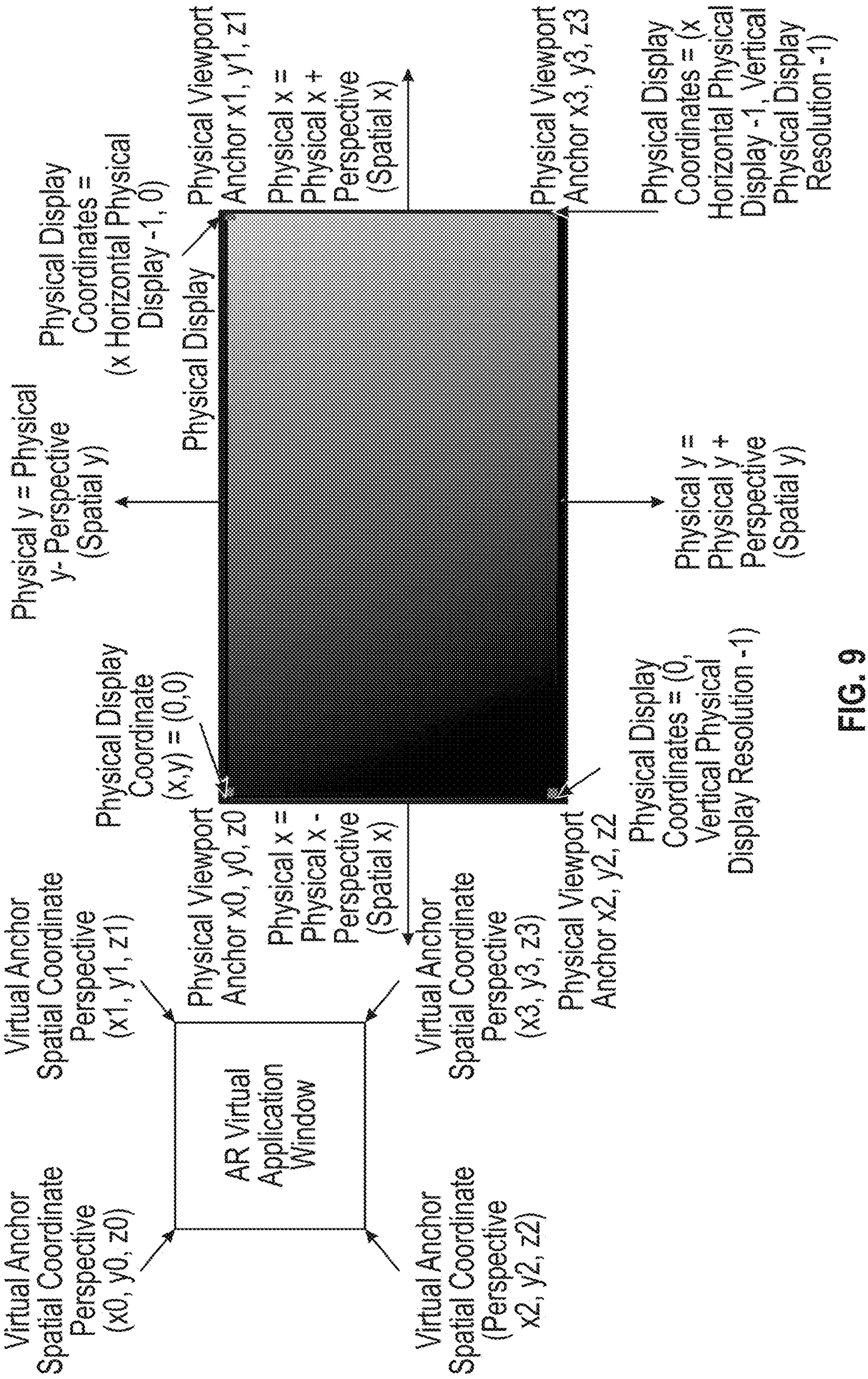
FIG. 9 is a schematic representation of a virtual display logically anchored to the physical space.

FIG. 9 is an example of a coordinate system calculation for setting a relationship for the spatial coordinates of a virtual display in a 3D spatial mapping space. This may be used for positioning virtual displays and for positioning virtual display zones 141, 143, 145, 147 in relation to physical space or to an object therein. A perspective transform may be performed to account for the offset differences based on the relative distance at each position of the virtual display and/or the virtual display zone to the physical space. The perspective transform may be locked allowing the user to select just the edges of an application window to drag the virtual display and/or the virtual display zone to a desired position. When the computing device is moved, the spatial coordinates of the virtual display zone and its virtual displays may remain unchanged. In an embodiment, a position of a virtual window in a physical space may be stored for future use. For example, when the computing device 101 returns to a physical space, the virtual display for the relevant application may open automatically at the same position in the virtual display zone. Similarly, an application may launch so that its output is displayed in a virtual display at the same location in the virtual display zone as in a previous use of the application.

Figure 10A:
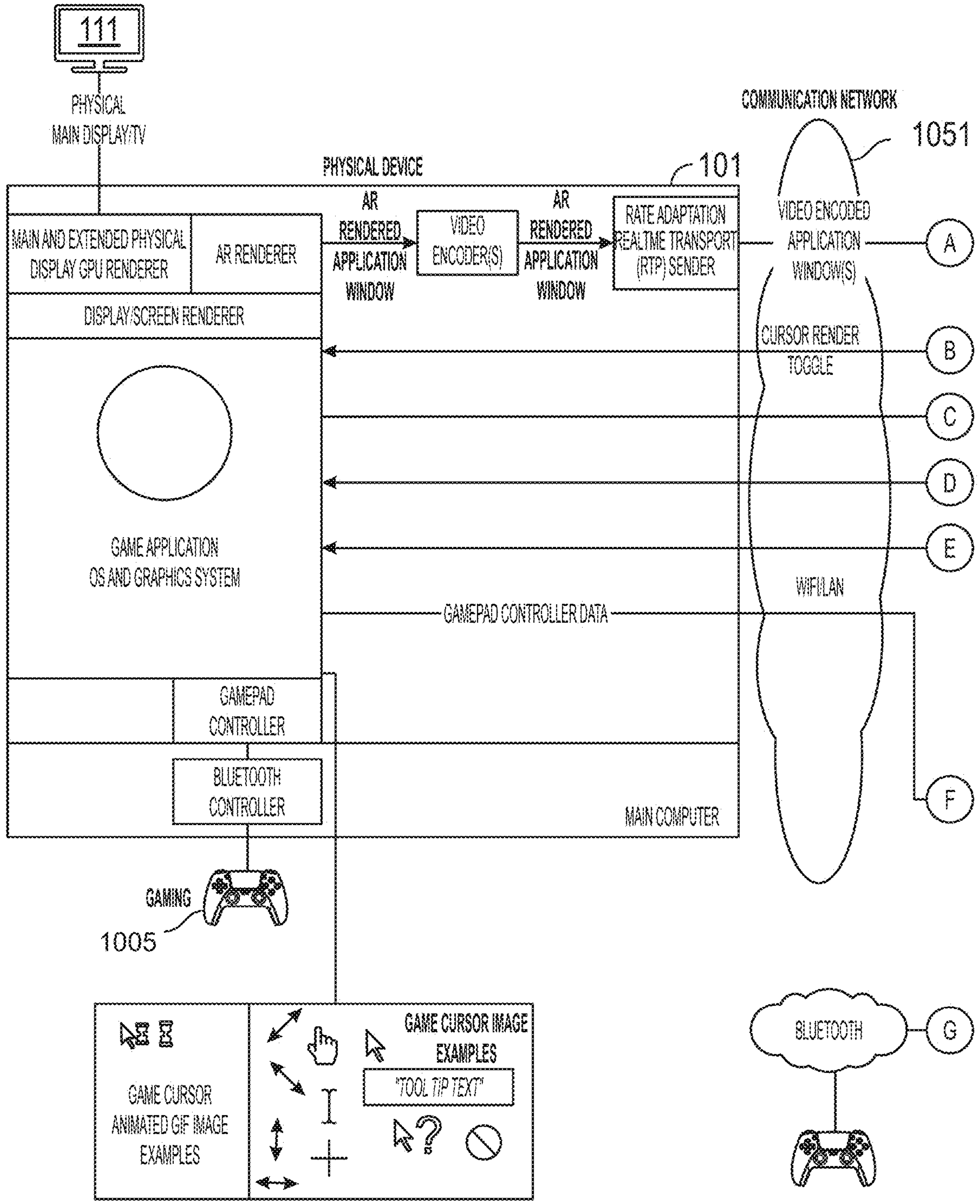
FIGS. 10A-10B illustrate components of a system according to an aspect of the disclosure, including the computing device, the XR HMD, and the XR HMD controller interfacing via a data network with the computing device.
Figure 10B:
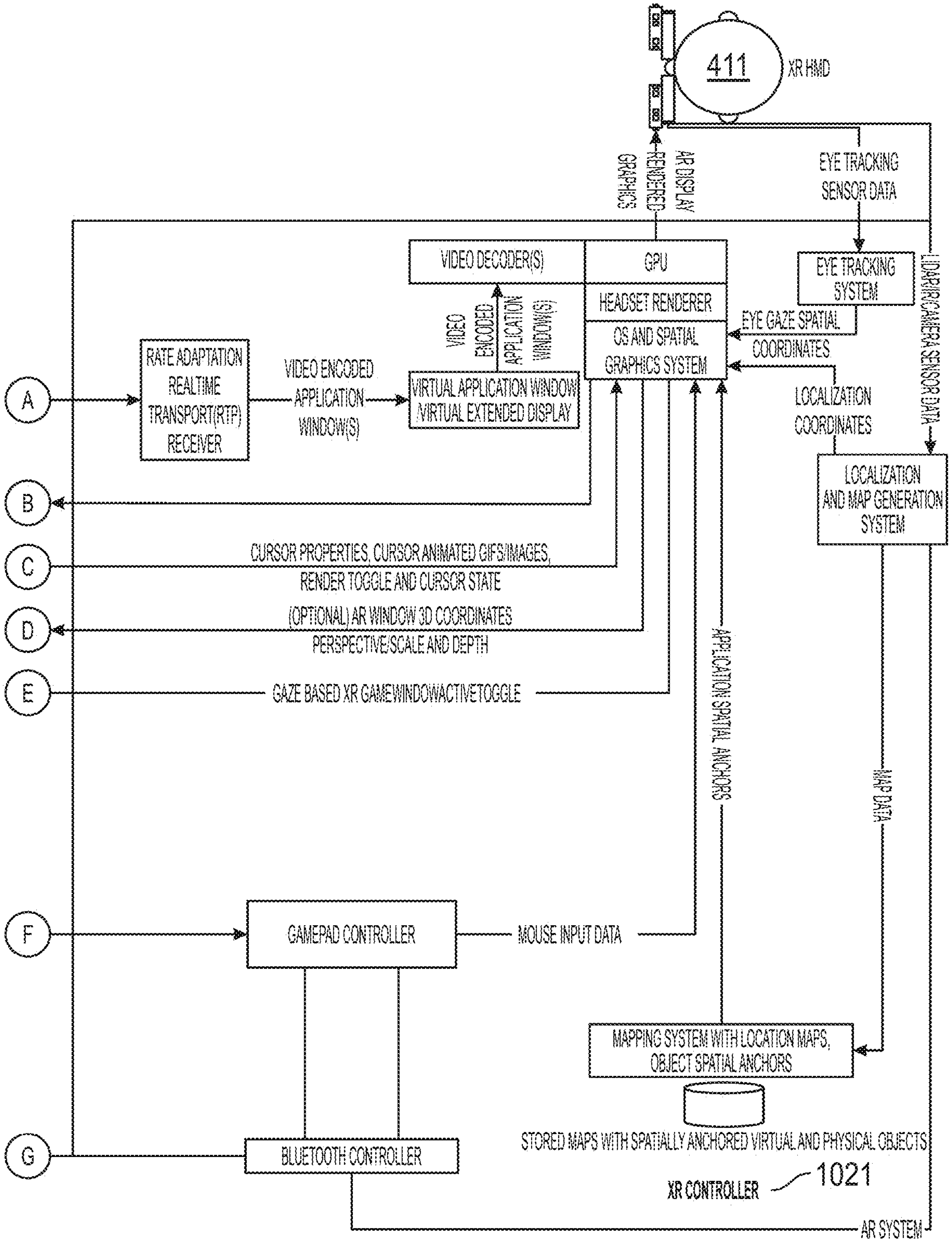

FIGS. 10A-10B show an example of a system architecture for enabling the computing device to transmit to the XR HMD controller 1021 the output of applications to be rendered as virtual displays, as well as to control cursor movement and rendering, and, more generally, the interaction of the computing device 101 with keyboard and mouse 1003, physical display 111, virtual display, XR HMD 868, and XR HMD controller 1021. As discussed, eye gaze detection may be used for automatically making active an application and/or display as the application and/or display of focus. The cursor may also be moved into the window thus made active. Cursor, mouse/trackpad/joystick position data and keyboard data may be transmitted via communication network 1051 from the OS and graphics handler of the computing device 101 to keyboard controller 1023 and the cursor controller 1025 of the XR HMD controller 1021. Communication network 1051 may be, for example, a local area network facilitated by a wireless router or may be the internet. This may facilitate seamless transition of work between the XR HMD 868/XR HMD controller 1021 and the physical controller 101.

An interface between the OS and graphics windowing system of the computing device 101 and the OS and spatial graphics system of the XR HMD controller 1021 may allow transmission of the output of relevant applications running on the computing device 101, including mouse cursor properties, cursor images and animated GIFs and cursor state to the XR HMD 868 for rendering the virtual displays, including mouse cursor when the cursor should be rendered on virtual display along with the cursor image to render based on the cursor state. In an embodiment, the cursor may also be rendered in space between displays to inform via the XR HMD 868 displays of cursor positioning from one display to another.

The computing device 101 may transmit coordinates for the virtual display 121 and data for displaying the virtual display 121 to XR HMD controller 1021 for generating the virtual display 121 at the XR HMD 868. For example, the device 101 may transmit the output of an application running on the device 101 to the XR HMD controller 1021. Accordingly, a virtual display 121 is displayed at 2206.

At 2214, further user input received at the physical controller 103 is applied to the application displayed on the newly selected display. As further user inputs are received for the relevant application, the output of that application is transmitted to XR HMD controller 1021 and rendered on the XR HMD 868. In an embodiment, the user may interact with the application using hand gestures or other extended reality/augment reality/virtual reality methods. In addition, the user may dictate or otherwise provide input via XR HMD 868. This input may be transmitted by XR HMD controller 1021 to the computing device 101 and applied as needed to the application running on the computing device 101.

The cursor and the virtual displays may be rendered by the XR HMD 868 when the cursor is on a virtual display and/or when the cursor is outside of the graphical user interface of the physical display 111 and outside coordinates of a virtually rendered display. XR HMD controller 1021 may notify computing device 101 which virtual display or physical display has focus/active. An interface between the XR HMD controller 1021 and the spatial and graphics system of the computing device 101 may communicate the 3D coordinates of the virtual display so that the computing device 111 may scale and adjust pixel values and cursor position for the virtual displays. The application windows rendered graphics may be encoded and sent to the display of the XR HMD 868 for rendering. There may be an interface for sending the mouse and keyboard data from the OS and Graphics on the computing device 101 to the Keyboard Controller and the Mouse/Trackball/other controller in the XR HMD 868. This allows the mouse and keyboard to work on both the computing device and the virtual displays or windows. An interface between the computing device's OS and Graphics Windowing System and the XR HMD's OS and Spatial Graphics System may enable transmission of mouse cursor properties, cursor images and animated GIFs and cursor state to the XR HMD 868 for rendering the mouse cursor when the cursor should be rendered in the physical space along with the proper cursor image to render, based on the cursor state. A render mouse toggle interface between the OD Graphics Window System and the OD and Spatial Graphics System may enable toggling between rendering the cursor on the computing device 101 or the XR HMD. The cursor rendering may be rendered by the XR headset when the cursor is in the physical space outside of the spatial coordinates of a physical display or a virtually rendered application window. In addition, an interface between the OD Graphics Window System on the computer and the OS and Spatial Graphics System may request keyboard input data, depending on where the mouse cursor position is. A gaze-based AR Application Window Active Toggle from the XR HMD's OS and Spatial Graphics System to the computer's OS and Graphics Windows System so the XR headset can inform the computing device 101 as to which application window has focus/is active regardless of whether the application is rendered in a physical display or in an XR virtual remote rendered application window. An interface between the XR HMD's OS and Spatial Graphics System and the computer's PS and Graphics Window System may be present for the AR window 3D coordinates with perspective and scale to allow the computing device 101 to adjust cursor pixel values if needed for precision in a virtual window. For display, the application window rendered graphics may be encoded and sent to the XR HMD display for rendering in a spatially anchored virtual window.

FIG. 11 is a flowchart that illustrates a process according to an aspect of the disclosure. The method 1100 may be implemented, in whole or in part, by the system 801 shown in FIG. 8. One or more actions of the method 1100 may be incorporated into or combined with one or more actions of any other process or embodiments described herein. The method 1100, or portions thereof, may be saved to a memory or storage (e.g., of the systems shown in FIG. 8) or locally as one or more instructions or routines, which may be executed by any suitable device or system having access to the memory or storage to implement the method 1100.

As shown at 1102 of FIG. 11, a first virtual display zone 141 may be set and positioned. For example, physical controller 103 of computing device 101 may be used to set up a first virtual display zone 141 and to drag one or more virtual displays 141*a*, 141*b* into the first virtual display zone 141 or to otherwise associate the one or more virtual displays 141*a*, 141*b* with the first virtual display zone 141. Applications whose outputs are provided as the one or more virtual displays 141*a*, 141*b* may be running on the computing device 101 or may be running on a remote device, such as in the cloud, with which the computing device 101 is in communication. Also, the first virtual display zone 141 may be anchored to a location in the first physical space or to an object, such as a piece of furniture, within the first physical space. The XR equipment 868 may be used in addition to, or instead of the computing device 101, to set up the first virtual display zone.

At 1104, one more policies for the first virtual display zone 141 may be set, for example, using the computing device 101 and/or using the XR equipment 868. As described herein, policies set for the first virtual display zone 141 may control a variety of behaviors of the first virtual display zone 141 and its virtual displays. The policy for the zone may include one or application attributes that define which applications will have outputs transmitted to the XR equipment 868 to be seen in the first virtual display zone. For example, the application attribute may filter all applications running on the computing device 101, or on a remote device with which the computing device is in communication, that present video communication or live communication, or applications that provide video content streaming, or application that are created or provided by a particular maker, source or vendor, or applications that are run on a device remote from the computing device 101, or applications that are contained on or otherwise associated with a particular drive or folder of the computing device 101. Other examples of a first application attributes may be applications that are run on both the computing device 101 and on a computing device remote from the computing device 101 (for example, at a home office if the computing device 101 is at a workplace), or applications that are run only on the computing device 101, or applications that are often used or that are indicated as preferred ("favorites") by the computing device 101, or applications that were most recently used, for example, in the past 12-48 hours by the computing device 101, or applications designated via the computing device 101 as to be made accessible by a second XR device in the same physical space or in a second physical space remote from the first physical space of the computing device 101.

In an embodiment, more than one such application attribute may be set for the first virtual display zone 141, so that all applications that correspond to any of the application attributes are positioned in the first virtual display zone 141. Or Boolean operators may be used such that only applications that correspond both to a first application attribute and to a second application attribute are seen in the first virtual display zone 141. For example, a user may be in a physical space at home and interested only in applications that are available at the workplace of the user and with which the user recently interacted. Thus, a first application attribute may be applications active on a computing device in a second physical space (office) remote from the first physical space (home) and a second application attribute may be applications that have been active in the past 8 hours. The first virtual display zone may thus contain virtual displays output by applications active in the past 8 hours on the second computing device.

At 1106, a second virtual display zone 143 may be set up. In an embodiment, the second virtual display zone 143 may be set up in a physical space distinct and remote from the first physical space in which the first virtual display zone 141 is set up. A policy may be set to share the second virtual display zone 143 with the XR equipment 868 in the first physical space. In this way, the second virtual display zone 143 and its virtual displays may be made visible to XR equipment in the first physical space.

Policies for the second virtual display zone 143 may be set, as shown at 1108. In an embodiment, policies for the second virtual display zone 143 may be set using the computing device 101 and or using the XR equipment 868 and the first physical space, even if the second virtual display zone 143 was initially set up in a remote physical space. For example, the computing device in a remote physical space open (not shown) may request that the computing device 101 in the first physical space set policies for the second virtual display zone 143. Or, the computing device in the remote physical space may set some policies for the second virtual display zone 143, while the computing device 101 in the first physical space may request permission from the remote computing device in the remote physical space to set other policies for the second virtual display zone 143. The policies for the second virtual display 143 may include one or more attributes. Some of these attributes for the second virtual display zone 143 may be the same as those for the first virtual display or they may totally different application attributes.

At 1110, it is determined whether an application that shares a first application attribute is active. For example, an application may be first downloaded to or installed on the computing device 101, launched on the computing device 101 or detected as being accessed by the computing device 101. If this is determined then processing proceeds to 1112.

At 1112, the computing device 101 generates a display, based on the output of the application(s) that share the first application attribute, and transmits it/them to the XR equipment 868. The coordinates of the virtual display and the first virtual display zone 141 are set in advance, as discussed. If the policy for the virtual display zone grants access to the application for more than one XR equipment, then the computing device 101 transmits the display to those XR devices.

At 1114, it is determined whether an application that shares a second application attribute is active. As discussed, there may be one or more second application attributes that are considered in making this determination. One or more of the second application attributes may be the same as one or more of the first application attributes.

At 1116, the computing device 101 generates a display, based on the output of the application(s) that share one or more of the second application attribute, and transmits it/them to the XR equipment 868. These outputs will be displayed by the XR HMD 868 as virtual displays in the second virtual display zone 143.

Figure 12A:
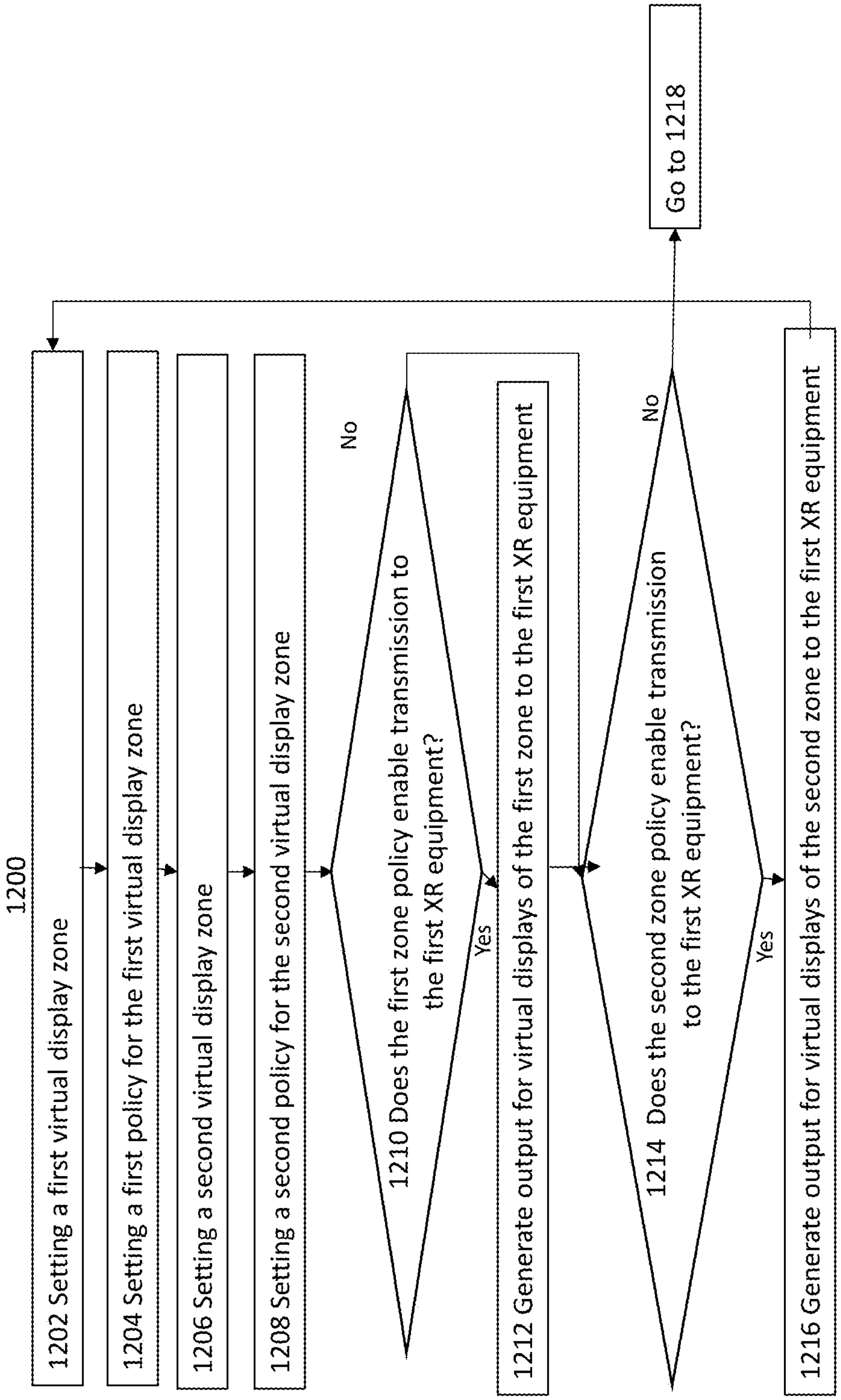
FIGS. 12A-12B illustrate an example of a process for virtual display zone control based on zone policy, according to an aspect of the disclosure.
Figure 12B:
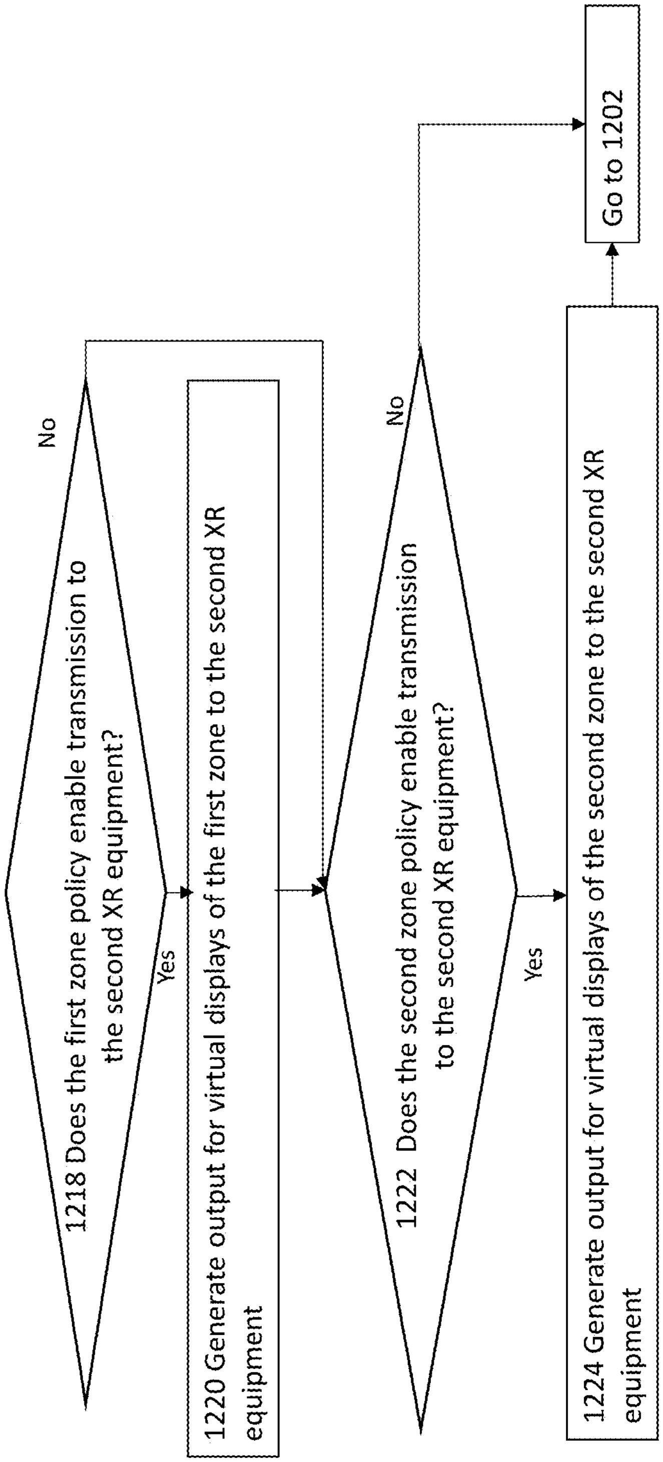

FIGS. 12A-12B present a flowchart that illustrates a process 1200 according to an aspect of the disclosure. The method 1200 may be implemented, in whole or in part, by the system 801 shown in FIG. 8. One or more actions of the method 1200 may be incorporated into or combined with one or more actions of any other process or embodiments described herein. The method 1200, or portions thereof, may be saved to a memory or storage (e.g., of the systems shown in FIG. 8) or locally as one or more instructions or routines, which may be executed by any suitable device or system having access to the memory or storage to implement the method 1200.

As shown at 1202 of FIG. 12, a first virtual display zone 141 may be set and positioned. The first virtual display zone 141 may be later moved as a whole, together with all its virtual displays, to another location in the first physical space. In the course of such a move to a different physical location, all of the properties of the first virtual display zone 141 may be kept. In addition, the first virtual display zone 141 may be later sent to another physical space remote from the first physical space. For example, it may be desired to send the first virtual display zone 141 together with its virtual displays from a first physical space in a home to a remote physical space in an office space.

At 1204, a first policy for the first virtual display zone 141 may be set. The policy may be a sharing policy that governs which other XR equipment, whether in the same first physical space or in a remote physical space, will have access to the first virtual display zone 141.

A second virtual display zone 143 may be set and positioned at 1206. In an embodiment, the second virtual display zone 143 may be set up by a second computing device open (not shown) in the same first physical space or in a different, remote, physical space. One or more applications associated with the virtual displays of the second virtual display zone 143 may be running on this second computing device and the outputs of the applications may be generated for display by the second computing device and transmitted to the XR HMD 868 to be shown in the first physical space as part of the second virtual display zone 143. In an embodiment, the second virtual display zone 143 may comprise virtual displays generated by different computing devices: a virtual display may be generated by the second computing device based on an application running on the second computing device, and the second computing device may transmit this for display as part of the second virtual display zone 143. Another virtual display may be generated by the computing device 101 based on an application running on the computing device 101, and this virtual display may also be shown as part of the second virtual display 143.

At 1208, a second policy for the second virtual display zone 141 may be set. The policy may be a sharing policy, as discussed with respect to the first policy. Or the policy may set access rights at set times or dates for one or more XR equipment. For example, the policy may grant access to the second virtual display zone 141 at certain times of the day or week, or set parental controls on the types of applications or types of content that may be viewed in virtual displays of the second virtual display zone 141. The second policy may enable filters that prevent some applications (a black list) from being displayed in the second virtual display zone 141, or that allow only some applications (white list) to be displayed in the second virtual display zone 141. Or more intelligent filtering may be used to screen the applications and/or the content that may be transmitted for display by the second virtual display zone 141.

At 1210, it is determined whether the first zone policy enables the first XR equipment to access the first virtual display zone 141. The sharing/access policy may set different levels of sharing, including: the ability to view and to hear the virtual displays of the first virtual display zone 141; the ability to view and to hear the virtual displays of the first virtual display zone 141 but with audio set to mute; the right to move around virtual displays within the virtual display zone 141; the right to share with other devices in the first physical space the first virtual display zone 141; the right to share with other devices in a remote physical space the first virtual display zone 141; and the right to alter zone policies of the first virtual display zone 141.

If at 1210 it is determined that the first virtual display zone 141 may be shared with the first XR equipment, then at 1212 the computing device transmits the contents for the virtual displays of the first virtual display zone 141 to the first XR equipment. If not, then processing moves to 1214.

At 1214, it is determined whether the second zone policy enables the first XR equipment to access the second virtual display zone 143. If yes, then processing continues to 1216. If not, then processing moves to 1218.

At 1216, the computing device transmits the contents for the virtual displays of the second virtual display zone 143 to the first XR equipment. As discussed, the transmission may be to an intermediate node, such as online XR controller or an XR controller connected via a local network to the XR equipment, which sends video and audio output to the XR equipment.

At 1218, it is determined whether the first zone policy enables the second XR equipment to access the first virtual display zone 141. If yes, then processing continues to 1220. If not, then processing moves to 1222.

At 1220, the computing device transmits the contents for the virtual displays of the first virtual display zone 141 to the second XR equipment. It will be understood that more than two such XR devices may be provided, and that one or more of these XR devices may be located in respective second and third physical spaces remote from the first physical space. A separate policy may be set for each XR device for each virtual display zone.

At 1222, it is determined whether the second zone policy enables the second XR equipment to access the second virtual display zone 143. If yes, then processing continues to 1224. If not, then processing returns to 1202.

At 1224, the computing device transmits the contents for the virtual displays of the second virtual display zone 143 to the second XR equipment. Processing returns to 1202.

Figure 13:
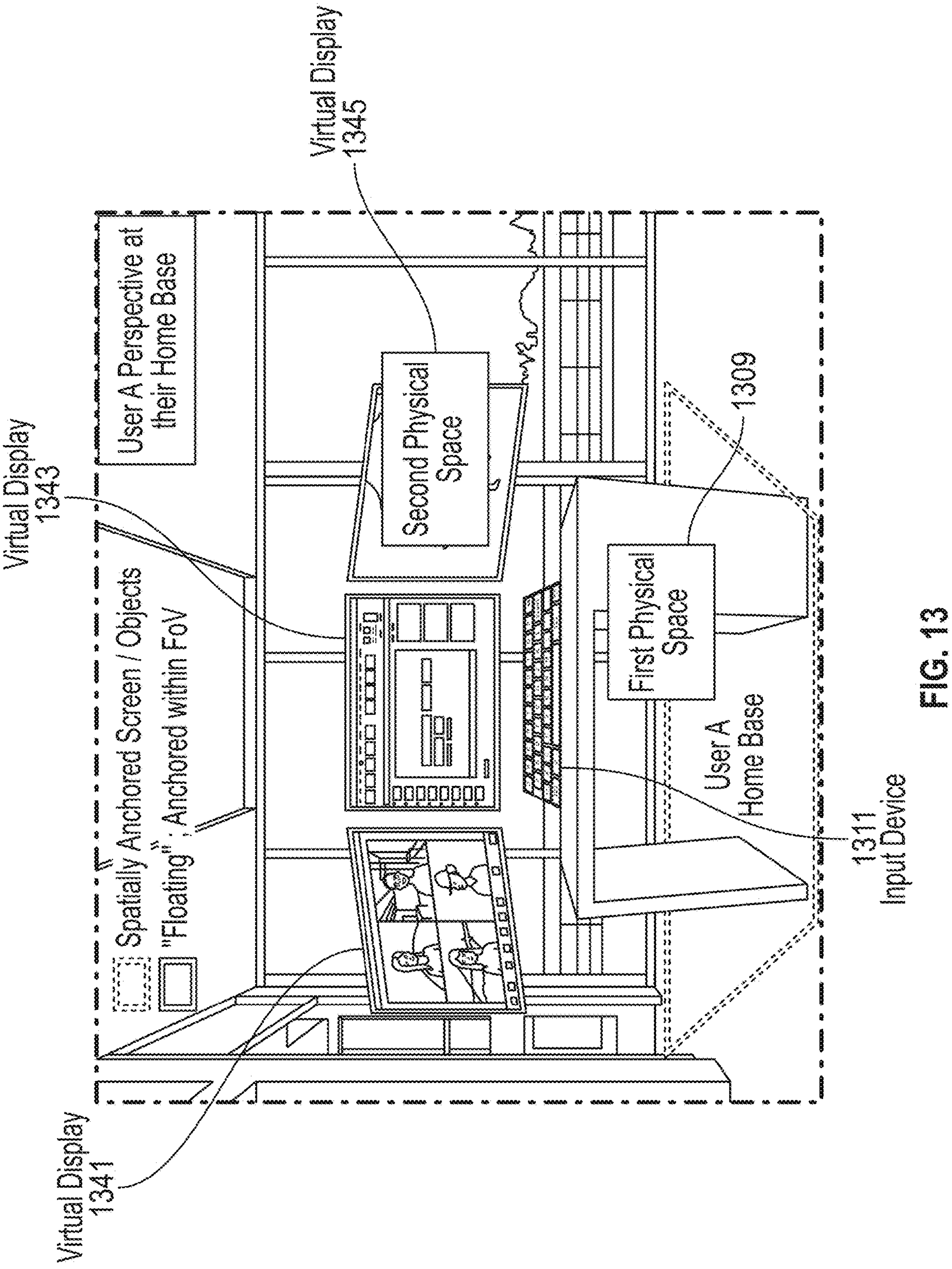
FIGS. 13-16 illustrate an example of de-anchoring from a first physical space, re-anchoring to XR equipment in a float mode, and re-anchoring virtual displays, according to an aspect of the disclosure.

Another embodiment is illustrated in FIGS. 13-17, in which virtual displays are anchored and re-anchored in response to movement of the XR HMD 868. As shown in FIG. 13. virtual displays 1341, 1343 and 1345 are displayed in the first physical space 1309 by XR HMD 868. Virtual displays 1341, 1343 and 1345 may be generated by applications that are running on a computing device 101 located in the first physical space 1309 or may be generated based on applications running in an XR HMD or on computing devices remotely positioned. Input device 1311 may be a physical keyboard and may be connected to the computing device 101, or input device 1311 may be a virtually-rendered input device, such as a virtual keyboard, for controlling applications whose output is rendered as virtual displays 1341, 1343, 1345. One or more of application windows or virtual displays 1341, 1343, 1345 may be generated by default automatically when downloading a corresponding application (the application whose output is rendered by the XR HMD as the virtual display) or when launching the corresponding application on the device that transmits it as the virtual display.

A virtual display may be created by interacting with user interface elements of applications displayed on the physical display of the computing device 101. For example, a window, panel or other graphical user interface element displaying or representing an application on the physical display may be dragged off of the graphical user interface area of the physical display, using the physical controls used to control the physical display or using XR equipment controls, to generate a new virtual display viewable on XR equipment. For example, three virtual displays may be automatically positioned to be seen on a semicircular arc, or approximately semicircular arc, or three displays may be positioned such that the middle display has a different Z-depth with respect to the user sitting in front of the central display, than the Z-depth of the side displays. In the embodiment illustrated in FIG. 13, more than one such virtual displays may be organized to be seen in the same virtual plane or along the same virtual arc, which may be the same virtual plane or arc as the one in which the physical display is located.

The virtual displays 1341, 1343, 1345 may be anchored to respective locations in the physical space, or to an object therein, or they may be anchored to the same location in the physical space, or to an object therein. The virtual displays may be anchored to the computing device 101 or to input device 1311 so that they move in response to movement, for example, in response to a change of angle of the position of the computing device or the input device 1311.

Figure 14:
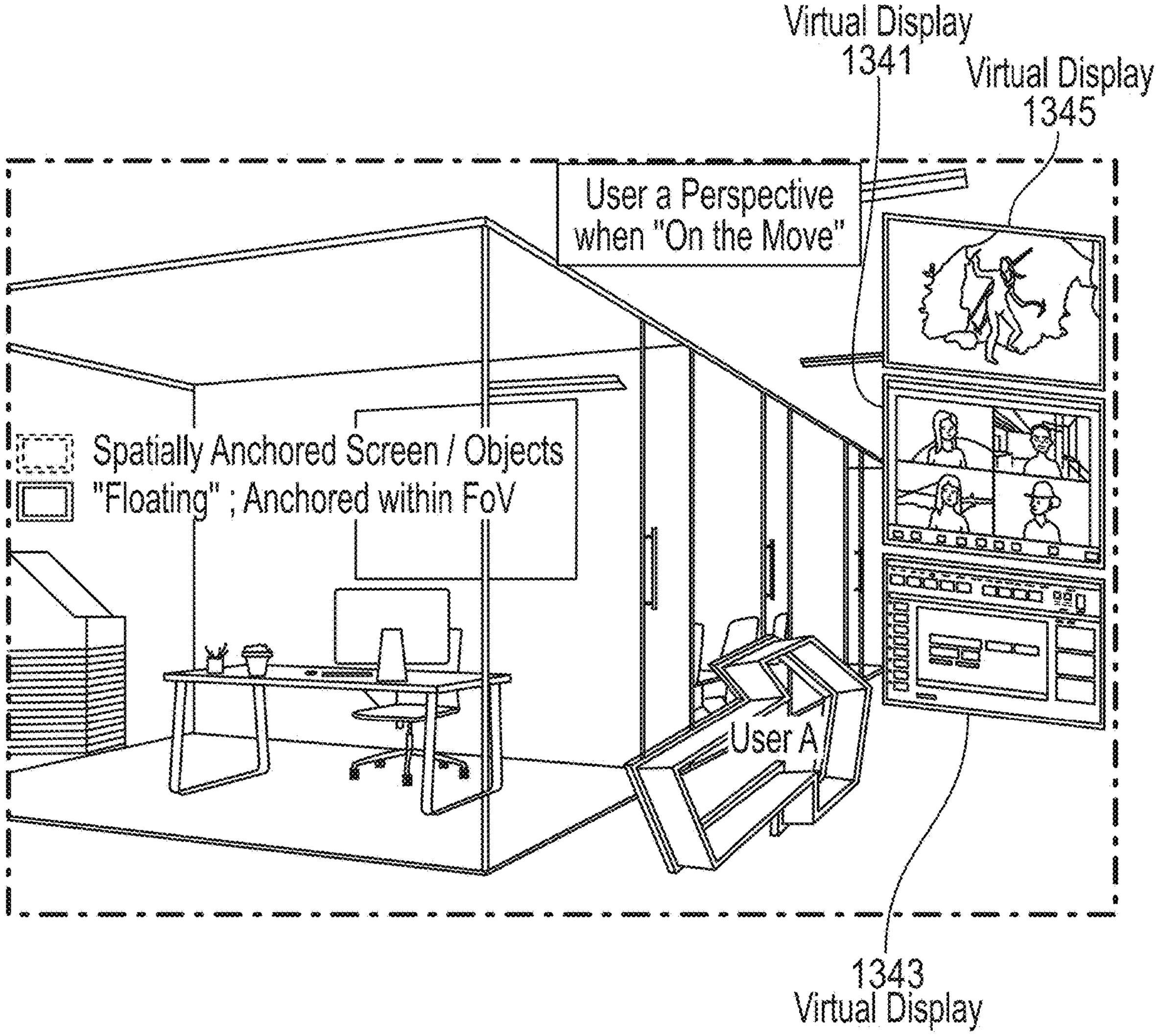

As shown in FIG. 14, the virtual displays 1341, 1343, 1345 may "float:" become de-anchored from their locations in the physical space upon detection of the XR HMD 868 moving away from or exiting the first physical space 1309, and the virtual displays 1341, 1343, 1345 become re-anchored to the XR HMD 868. In this way, as the XR HMD 868 moves through space, the virtual displays 1341, 1343, 1345 are aligned so that they are visible for a wearer of the XR HMD 868. In an embodiment, only virtual displays that are designated to float, are active at the time the floating is to start, or with which the user has interacted within a threshold time period, for example, 5-600 minutes, become floating virtual displays.

As further shown in FIG. 14, when the virtual displays enter a float mode one or more of the virtual displays 1341, 1343, 1345 may be made more prominent than the remaining virtual displays based on priority determinations. For example, virtual display 1341 may be determined to be a live video conferencing session and thus determined to have priority and thus positioned in the middle, more or less eye level with respect to the wearer of the XR HMD 868. In an embodiment, a live video conferencing session for live communication application may be made determined to have priority and thus be made more prominent than the other virtual displays. In a further embodiment, a virtual display based on the output of a streaming content application may be determined to have priority and thus be made more prominent. According to an embodiment, some applications may be manually flagged such that virtual displays generated based on their outputs have priority and are, therefore, made more prominent. A hierarchy of application priorities may be set, for example, a virtual display rendered based on a live video conferencing application may have top priority, while a texting or emailing application may have a low priority but a higher priority than remaining applications. Or, a texting or emailing application may have a low priority but may be moved up to an intermediate priority—just below a live video conferencing application and above other applications—if it is detected that a new email or a new text has been received and the new email or text has yet to be read.

A virtual display may be made more prominent, for example, by one or more of positioning it more prominently than the remaining virtual displays, making it larger, changing its color, resolution contrast or clarity, adding a border, or flashing border, around it, or the like. If a hierarchy of priorities is set, then an application with a top priority may have a virtual display that is rendered more prominently than the virtual display of an application with an intermediate priority level, which would still be rendered more prominently than that of an application with a low priority level.

If virtual displays are rendered as part of a virtual display zone, then a policy for the virtual display zone may specify that the virtual displays of the zone become de-anchored with respect to the first physical space and are re-anchored with respect to the XR HMD upon detection of the XR HMD exiting the first physical zone. Further, the zone policy may dictate which virtual displays of the zone have priority.

Figure 15:
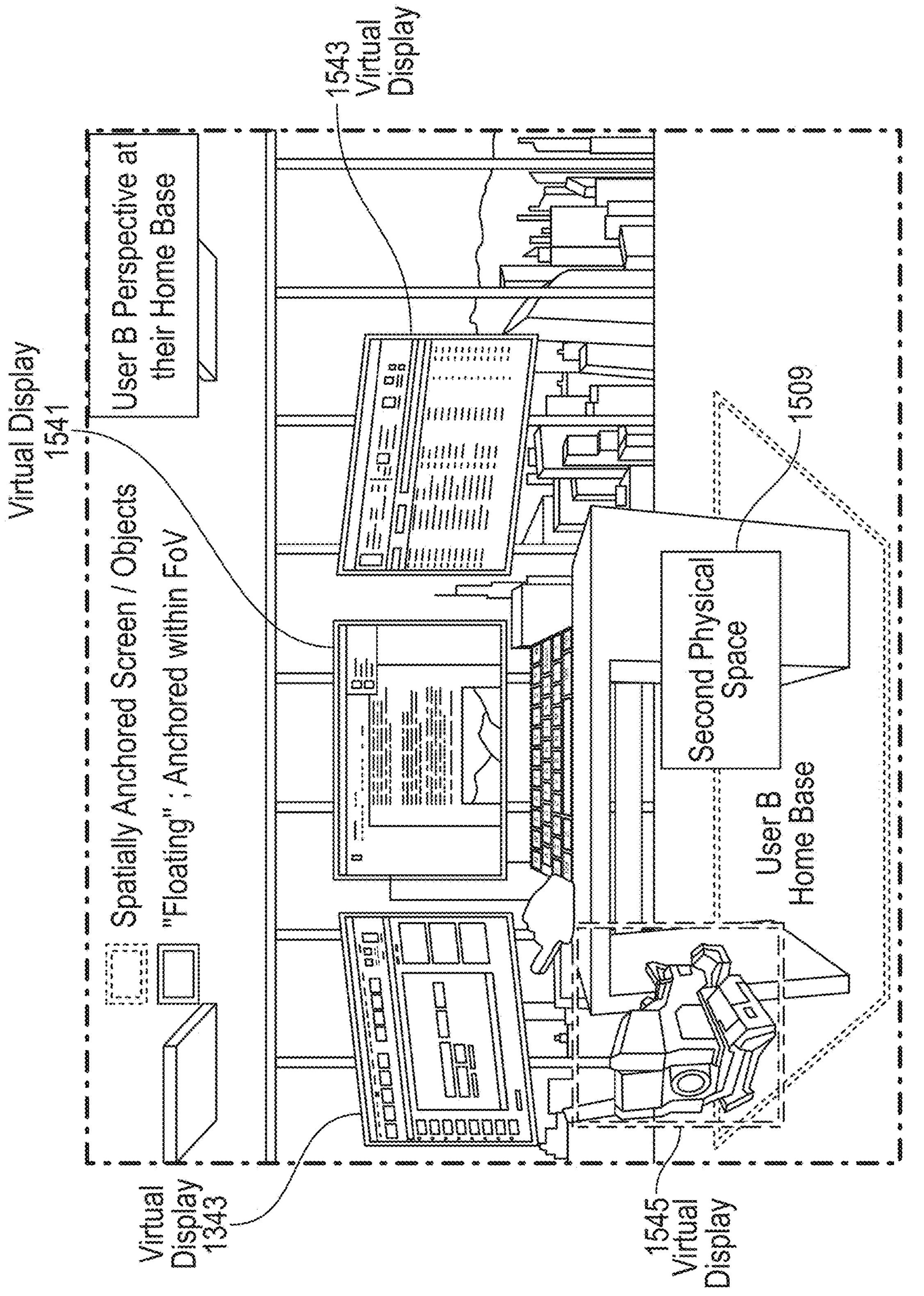
Figure 16:
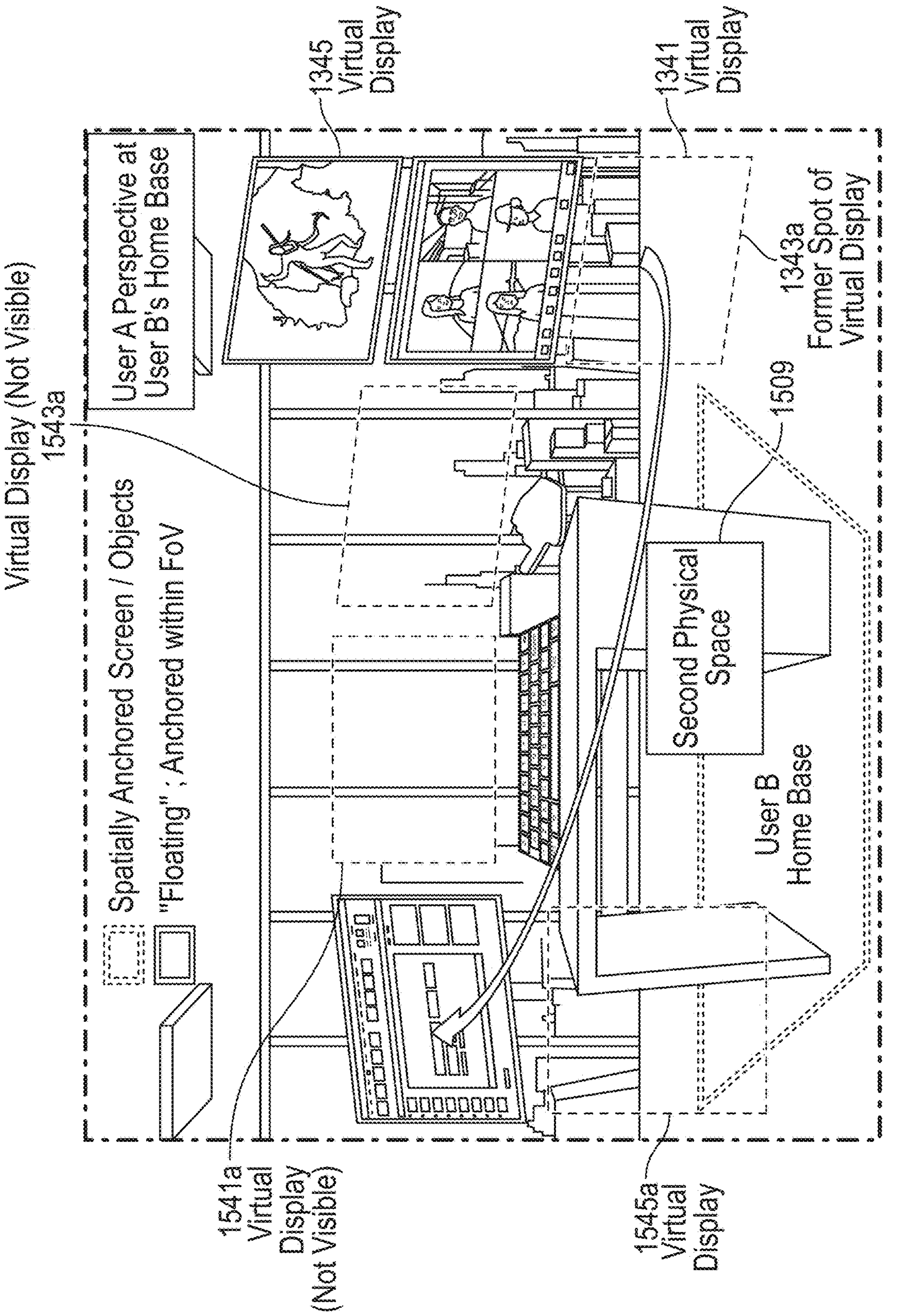

Shown in FIG. 15, is a second physical space 1509 of User B as seen wearing user B's XR equipment. User A has entered with the floating virtual displays 1345, 1341 rendered by the XR equipment of User A, but User A's XR equipment does not display virtual display 1541 in spot 1541*a*, virtual display 1543 in spot 1543*a*, or virtual object 1545 in spot 1545*a*, as shown in FIG. 16. User A's XR equipment renders the virtual displays 1345 and 1341 shown in FIG. 16. However, these virtual displays are not rendered by User B's XR equipment. Conversely, User B's XR equipment renders virtual displays 1541, 1543 and virtual object 1545, which are not rendered by User A's XR equipment.

Virtual display 1343 had been rendered by the XR equipment of User B, and as a floating virtual display by the XR equipment of User A. The former spot 1343*a* of virtual display 1343 currently lacks a virtual display. Thus, virtual display 1343 may be a shared application on which users A and B work collaboratively. In the embodiment illustrated, virtual display 1343 may be anchored to a location in the second physical space and the floating instance of it may be terminated.

In an embodiment, the system may search for a designated area or volume, a 3D area, in the second physical space.

The system may render the virtual display that is seen by both users in the designated space. In work environments, such designated areas may be virtual whiteboards or projection screens in common spaces such as meeting rooms, whiteboard and the like. Or, if there is no designated area in proximity to the users, then a common rendering area or volume may be computed "on-the-fly" by the system to render a shared application for the two or more users. The computation of this space or volume may be based on a multitude of parameters. For example, when only two users are working on a shared application, then the system may use an approach that minimizes the deviation from their current gaze direction vector to converge to common rendering space, such that the distance of the common rendered application is bounded by the system based on user's ability to read/point to/manipulate the rendered virtual display.

Figure 18:
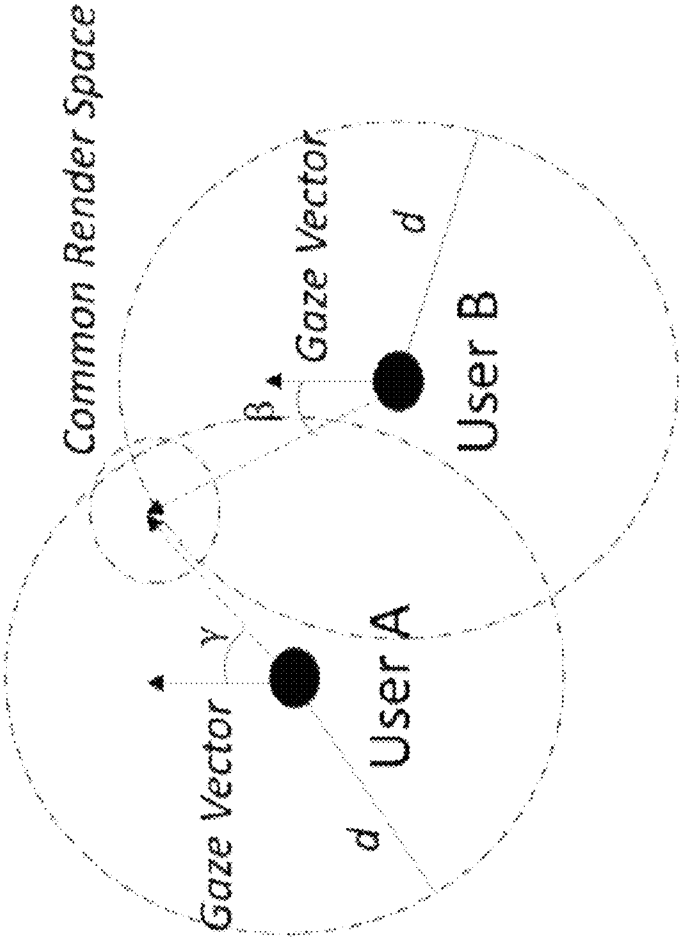
FIG. 18 shows determination of a common render area based on gaze detection by two XR devices, according to an aspect of the disclosure.

As shown in FIG. 18, the system may attempt to minimize the deviation of the users' gaze vectors, B and y, while ensuring that the common render space is not greater than a distance d from either user. In another embodiment, the system may attempt to minimize the distance of the common render space from both the users. A further embodiment may take into account the distance of the common render space with/without the users' gaze direction. The system may automatically find the common render space after it has determined that users sharing a common physical space and collaborating on a common application have stopped moving in the second physical space, or that movement is within an acceptable threshold. In addition, or in the alternative, the system may prompt the users using a query such as "Collapse the Following Shared Application(s) for Collaboration". When users agree by responding, then the system collapses the individual user instances of a shared application into a common instance for collaboration.

A visual positioning system (VPS) may be used to determine the position and orientation of every user wearing XR equipment. Thus, the locations and orientations of users with respect to each other can be determined and displayed graphically. In some embodiments, the tasks of determining users' positions and orientations with respect to each other, as well as determining a suitable render space for collaboration are performed by a central server. The different users may communicate their head pose (position/orientation) to this central computer unit. In other embodiments, an XR HMD with privileges may receive the poses of the other XR HMDs in proximity and compute the render space. For example, in a classroom the teacher's XR HMD may receive the locations/orientations of the students and compute the common render space (with or without assistance of another compute unit).

Figure 17:
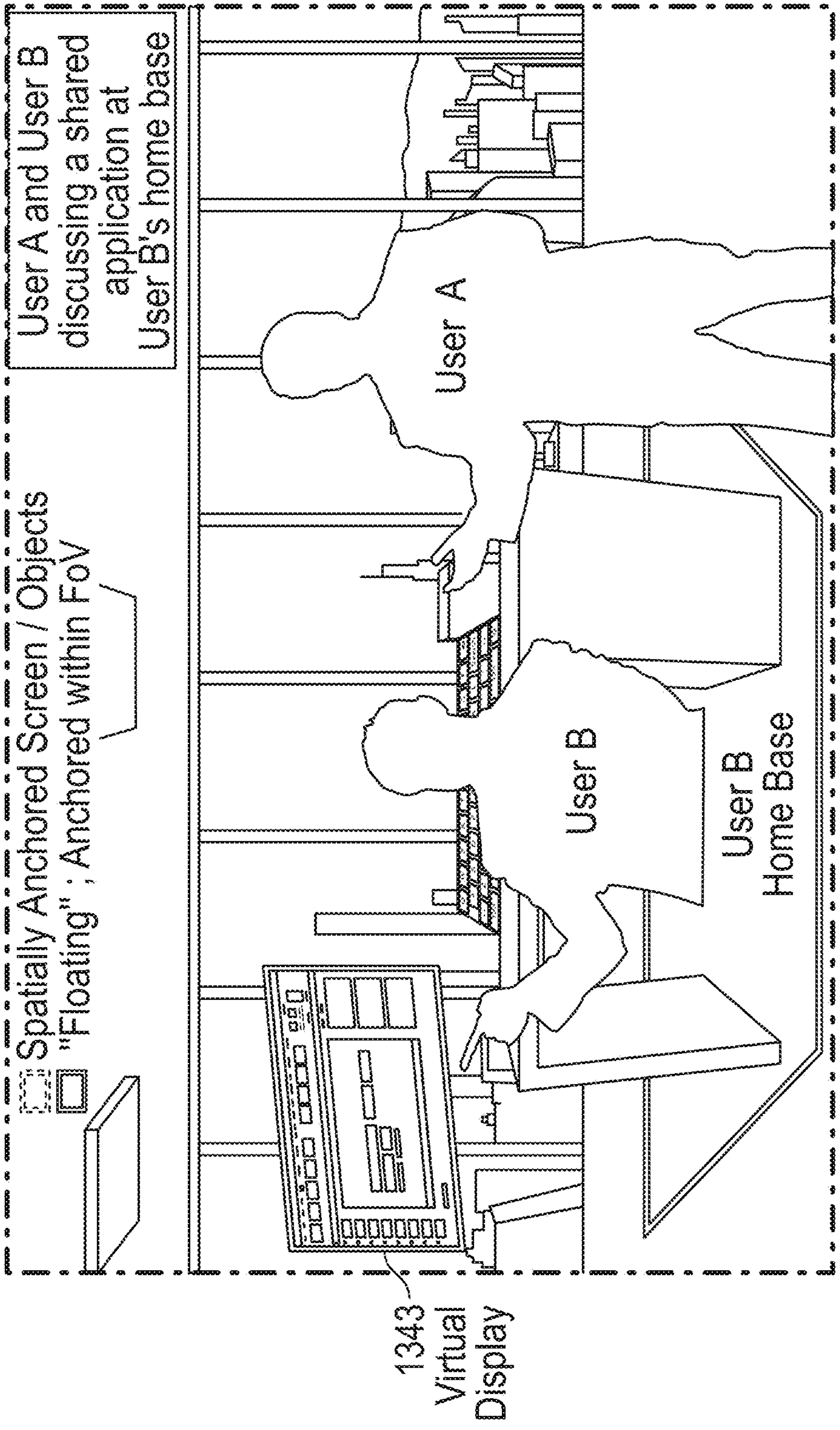
FIG. 17 illustrates a virtual display based on an application shared by two XR devices, according to an aspect of the disclosure.

FIG. 17 illustrates the virtual display 1343 seen by both User A and User B. As shown in FIG. 17, virtual display 1343 is visible on the XR equipment of both User A and User B. In an embodiment, if virtual display 1343 had not been active on the XR equipment of User B, it may still be rendered on the XR equipment of User B if a zone policy is set to share virtual display 1343 on the XR equipment of User B. Further, virtual display 1353 may become anchored to a location in the second physical space and the floating instance of it may be terminated automatically if a virtual display zone had been created in the second physical space, and the virtual display 1343 had been assigned to the virtual display zone. In an embodiment, if both users have access to content associated with the application, then shared access to the virtual display may be provided, as shown in FIG. 17. For example, if both users have access to a data file or other data set accessed by the application, then the virtual display may be rendered by both XR devices.

FIG. 19 is a flowchart that illustrates a process for providing floating virtual displays and re-anchoring them in a physical space, according to an aspect of the disclosure. The method 1900 may be implemented, in whole or in part, by the system 801 shown in FIG. 8. One or more actions of the method 1900 may be incorporated into or combined with one or more actions of any other process or embodiments described herein. The method 1900, or portions thereof, may be saved to a memory or storage (e.g., of the systems shown in FIG. 8) or locally as one or more instructions or routines, which may be executed by any suitable device or system having access to the memory or storage to implement the method 1900.

As shown at 1902 of FIG. 19, a first virtual display anchored to a location in the first physical display may be generated as shown in FIG. 13. A second and additional virtual displays anchored to a location in the first physical display may also be generated, as shown at 1904.

As shown at 1906, the system may detect that the first XR equipment has left the first physical space. SLAM (Simultaneous Localization And Mapping) technology may be used to determine the near instantaneous position of XR equipment.

At 1908, in response to the detecting that the first XR equipment has left the first physical space, the system may de-anchor the first and second virtual displays from the first physical space and re-anchor the first and second virtual displays to the first XR equipment. For example, the first and second virtual displays may be positioned to be visible by a user wearing XRH MD. This is shown in FIG. 14. The near instantaneous position of the first XR equipment may be continuously detected by the system and the first and second virtual displays may continue to be generated with respect thereto.

At 1910, the system may determine that the first virtual display has priority over remaining virtual displays. If this is not determined, then processing moves to 1914.

At 1912, in response to the determining priority of one of the virtual displays, this virtual display is displayed more prominently than remaining virtual displays. In an embodiment, a highest priority level set for an application associated with a virtual display may cause the system to cease generating the remaining virtual displays.

As shown at 1914, the system may detect that the first XR equipment has entered a second physical space, as shown in FIG. 16. If not, then virtual displays continue to be rendered, in this case in float mode.

At 1916, in response to the detecting that the first XR equipment has entered a second physical space, the first and second may be re-anchored in the second physical space. As discussed, a policy set for virtual display zones associated with the application whose output is generated for the first virtual display may determine whether the first virtual display is re-anchored in the second physical space, and where in the second physical space it is re-anchored. A policy set for virtual display zones associated with the application whose output is generated for the first virtual display may determine whether the first virtual display is rendered on a second XR device present in the second physical space. Processing continues, the first and second virtual displays may continue to be rendered.

Figure 20:
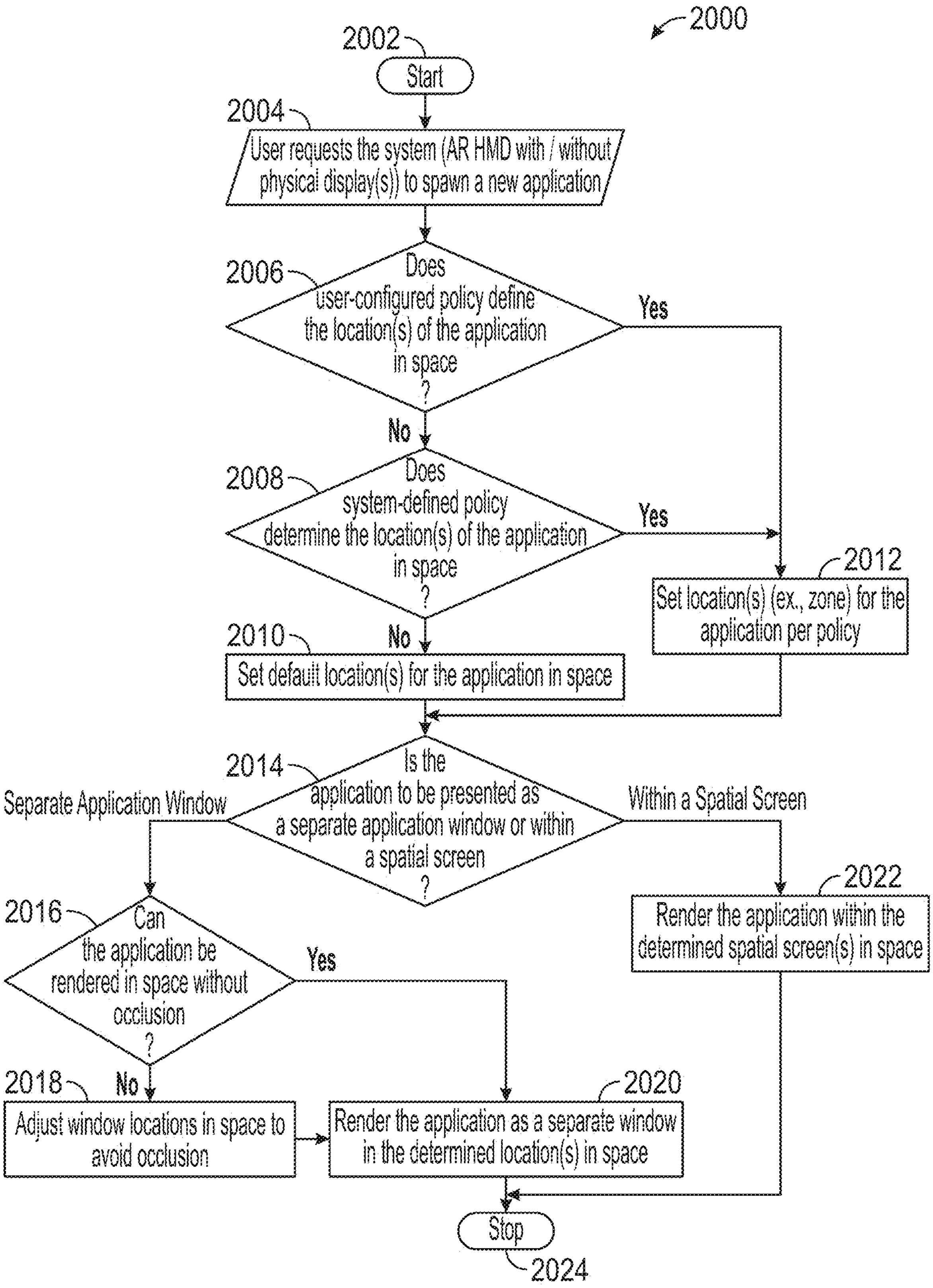
FIG. 20 illustrates a process for virtual display positioning, according to an aspect of the disclosure.

FIG. 20 shows a process to determine the location(s) of an application in space when the user requests the system to spawn a new location. After system start at 2002, at 2004 an application may be spawned automatically, for example, when launched on the computing device 101.

At 2006, the system determines whether a policy set by the user is in place to render the virtual display that is generated based on the application in a specified location, for example, in a virtual display zone. If not, then at 2008, the system determines whether a policy set by the system is in place to render the virtual display that is generated based on the application in a specified location, for example, in a virtual display zone. For example, a system-defined policy may be that a virtual display based on the output of an application that provides live video conferencing is placed in a central location to encourage eye contact. If there is no policy set, then at 2010 the virtual application generated by the system based on the application may be positioned at a default location. If there is a policy, then at 2012, the virtual display is rendered at the location called for by the policy.

At 2014, the system determines whether the virtual display is to be displayed individually or is to be displayed in a virtual display zone. For example, if the application has an application attribute that matches a virtual display zone application attribute, then at 2022 the virtual display is positioned in the virtual display zone. If the virtual display is rendered individually then at 2016 it is determined whether it can be rendered without occlusion or obstruction, for example, by another virtual display or virtual display zone to which it does not belong. If yes, then at 2020, the virtual display is rendered as a separate window and the process proceeds to stop at 2024. On the other hand, if the virtual display cannot be rendered without occlusion then at 2018 the location is adjusted so that at 2020 it can be properly rendered and the process proceeds to stop at 2024.

Figure 21:
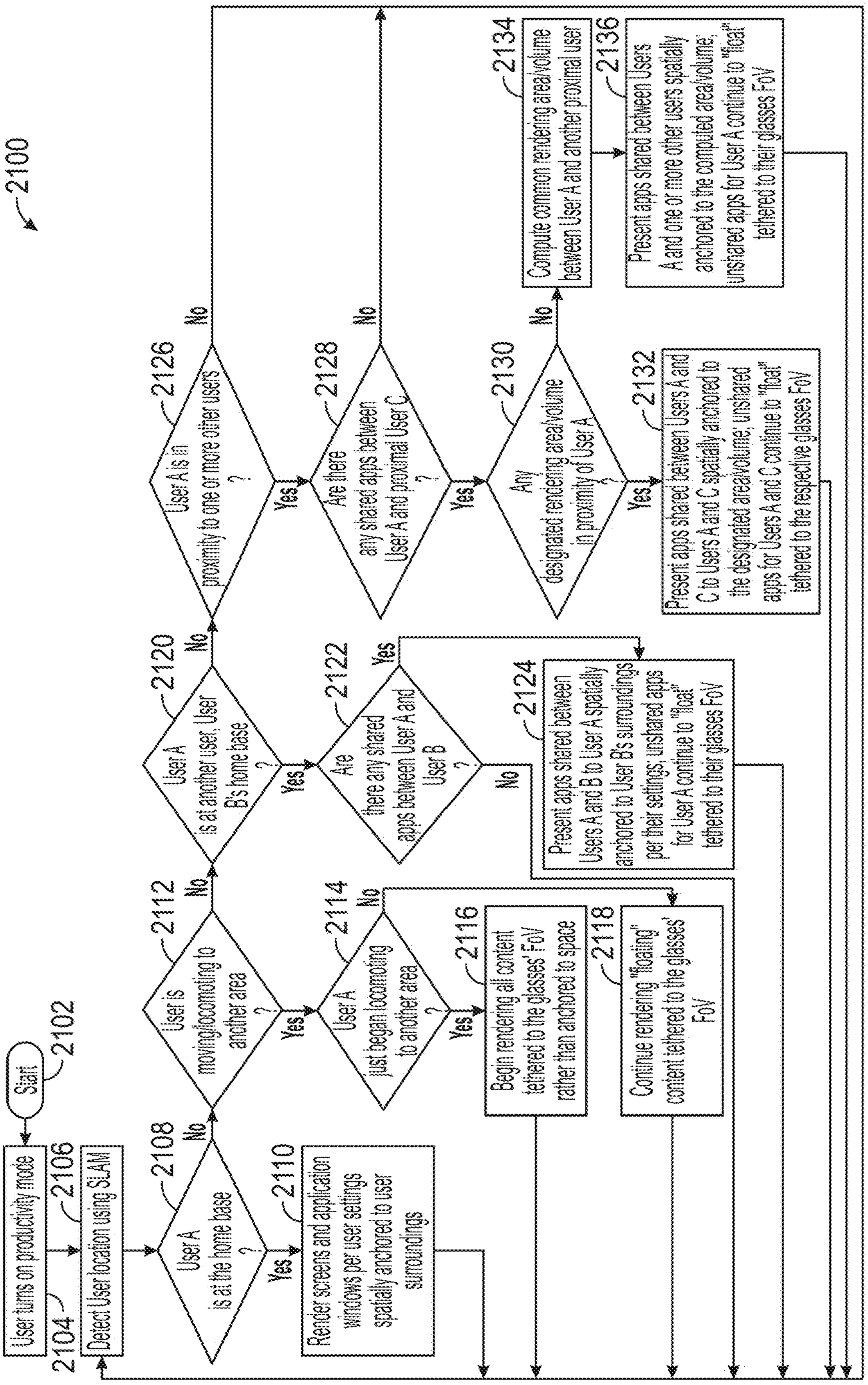
FIG. 21 illustrates a process for virtual display positioning in response to XR equipment movement and location, according to an aspect of the disclosure.

FIG. 21 illustrates a method for adjusting user interface between spatially anchored and floating windows, depending on the users' locations and motion. After system start at 2102, at 2104 virtual displays are rendered in spatially anchored mode based on their settings in the first physical space.

At 2106, the system detects that the XR equipment is moving. If at 2108 the system determines that the XR equipment has not left the first physical space, then 2110, the virtual displays continue to be rendered as before, anchored to one or more locations in the first physical space. If at 2112 it is determined that the XR equipment has left the first physical space, then at 2114 the system determines whether the XR equipment is moving outside of a known physical space. If so, then 2116, the virtual displays may be rendered in a floating mode: anchored to the XR display rather than to a location in the first physical space. This rendering continues at 2118.

At 2120, the system detects that the XR equipment has entered a known second physical space. If at 2122 the system determines that there are shared applications between the first XR equipment and a second XR equipment, that is, applications to which both are granted access, then at 2124 the virtual display of such applications may be displayed anchored to a location in the second physical space. Thus, the users can collaborate on the application using a common instance of that application anchored in the second physical space. If each of the users opens a new application in collaboration mode, then the user who is within their own physical space may get their perspective of the spatially anchored window of the shared application cascaded to the other user(s). This user may further adjust the location of this window in space so that all users present may work from/discuss a common spatial representation of the application.

At 2126, the system detects whether the first XR equipment is in proximity to a second XR equipment. If at 2126 this is detected, then 2128 the system determines whether any applications exist to which both the first XR equipment and a second XR equipment have access. If so, then the virtual display of such applications at 2124 may displayed. For example, if at 2130, a designated rendering location is detected in the vicinity, then at 2132 the virtual displays by default may be rendered in the designated rendering location spatially anchored to the location; if not, then processing proceeds to 2134. According to an embodiment, the users may be prompted to designate such a location. At 2136, the application to which both the first XR HMD and the other XR HMD have access may be displayed anchored to the newly designated location.

The methods or processes 2200-2600 may be implemented, in whole or in part, by the system(s) described herein and shown in the figures. One or more actions of the depicted processes may be incorporated into or combined with one or more actions of any other process or embodiments described herein. The processes may be saved to a memory or storage (such as any one or more of those shown in FIGS. 8 and 10A-10B) as one or more instructions or routines that may be executed by a corresponding device or system to implement the process. Depending on the embodiment, one or more steps of the described process may be implemented or facilitated by a server. While some of the description corresponding to the processes 11-13 and 1900-2100 references HMDs, it will be appreciated that the described steps may be implemented with respect to any suitable XR device in some embodiments.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:

generating a first virtual display viewable on a first XR equipment, wherein the first virtual display is anchored in a first physical space such that a position of the first virtual display relative to the first location remains unchanged in response to movement of the first XR equipment within the first physical space; and in response to detecting the first XR equipment outside the first physical space:

de-anchoring the first virtual display from the first physical space, and anchoring the first virtual display to the XR equipment such that the first virtual display moves automatically in response to movement of the first XR equipment.

2. The method of claim 1, further comprising:

generating a second virtual display viewable on the first XR equipment, wherein the second virtual display is anchored in the first physical space such that a position of the second virtual display remains unchanged in response to movement of the first XR equipment within the first physical space;

in response to detecting movement of the first XR equipment outside the first physical space, de-anchoring the second virtual display from the first physical space and anchoring the second virtual display to the XR equipment such that the second virtual display moves automatically in response to movement of the first XR equipment; and in response to determining that the first virtual display has priority over the second virtual display, displaying the first virtual display more prominently than the second virtual display while the first XR equipment is outside the first physical space.

3. The method of claim 2, wherein the determining that the first virtual display has priority over the second virtual display comprises:

determining a more recent user interaction with a first application associated with the first virtual display than with a second application associated with the second virtual display.

4. The method of claim 2, wherein the determining that the first virtual display has priority over the second virtual display comprises:

determining a more frequent user interaction with a first application associated with the first virtual display than with a second application associated with the second virtual display.

5. The method of claim 2, wherein the XR equipment comprises a head mounted device, and wherein the displaying the first virtual display more prominently than the second virtual display comprises displaying the first virtual display at eye level with respect to the head mounted display.

6. The method of claim 1, further comprising:

in response to determining that the first XR equipment is in a second physical space, generating the first virtual display such that the first virtual display is anchored in the second physical space, wherein a position of the first virtual display remains unchanged in response to movement of the first XR equipment within the second physical space.

7. The method of claim 6, wherein the second physical space is separate and distinct from the first physical space.

8. The method of claim 6, further comprising:

in response to detecting a second XR equipment in the second physical space, generating for viewing by the second XR equipment the first virtual display.

9. The method of claim 6, further comprising:

generating a second virtual display viewable on the first XR equipment, wherein the second virtual display is anchored to a location in the second physical space such that a position of the second virtual display remains unchanged in response to movement of the first XR equipment within the first physical space; and in response to detecting a second XR equipment in the second physical space:

generating for viewing by the second XR equipment the first virtual display and preventing from viewing by the second XR equipment the second virtual display.

10. The method of claim 6, further comprising:

in response to detecting a second XR equipment in the second physical space, preventing from viewing by the second XR equipment the first virtual display;

determining that the second XR equipment has interacted with content associated with first virtual display; and in response to the determining that the second XR equipment has interacted with the content, generating for viewing by the second XR equipment the first virtual display.

11. A system comprising:

processing circuitry configured to generate a first virtual display viewable on a first XR equipment, wherein the first virtual display is anchored in a first physical space such that a position of the first virtual display relative to the first location remains unchanged in response to movement of the first XR equipment within the first physical space; and communication circuitry configured to detect the first XR equipment outside the first physical space;

wherein the processing circuitry, in response to the detecting the first XR equipment outside the first physical space, is configured:

to de-anchor the first virtual display from the first physical space, and to anchor the first virtual display to the XR equipment such that the first virtual display moves automatically in response to movement of the first XR equipment.

12. The system of claim 11, wherein the system is configured:

to generate a second virtual display viewable on the first XR equipment, wherein the second virtual display is anchored in the first physical space such that a position of the second virtual display remains unchanged in response to movement of the first XR equipment within the first physical space;

in response to detecting movement of the first XR equipment outside the first physical space, to de-anchor the second virtual display from the first physical space and to anchor the second virtual display to the XR equipment such that the second virtual display moves automatically in response to movement of the first XR equipment; and in response to determining that the first virtual display has priority over the second virtual display, to display the first virtual display more prominently than the second virtual display while the first XR equipment is outside the first physical space.

13. The system of claim 12, wherein the determining that the first virtual display has priority over the second virtual display comprises:

determining a more recent user interaction with a first application associated with the first virtual display than with a second application associated with the second virtual display.

14. The system of claim 12, wherein the determining that the first virtual display has priority over the second virtual display comprises:

determining a more frequent user interaction with a first application associated with the first virtual display than with a second application associated with the second virtual display.

15. The system of claim 12, wherein the XR equipment comprises a head mounted device, and wherein the displaying the first virtual display more prominently than the second virtual display comprises displaying the first virtual display at eye level with respect to the head mounted display.

16. The system of claim 11, wherein the system is configured:

in response to determining that the first XR equipment is in a second physical space, to generate the first virtual display such that the first virtual display is anchored in the second physical space, wherein a position of the first virtual display remains unchanged in response to movement of the first XR equipment within the second physical space.

17. The system of claim 16, wherein the second physical space is separate and distinct from the first physical space.

18. The system of claim 16, wherein the system is configured:

in response to detecting a second XR equipment in the second physical space, to generate for viewing by the second XR equipment the first virtual display.

19. The system of claim 16, wherein the system is configured:

to generate a second virtual display viewable on the first XR equipment, wherein the second virtual display is anchored to a location in the second physical space such that a position of the second virtual display remains unchanged in response to movement of the first XR equipment within the first physical space; and in response to detecting a second XR equipment in the second physical space:

to generate for viewing by the second XR equipment the first virtual display and to prevent from viewing by the second XR equipment the second virtual display.

20. The system of claim 16, wherein the system is configured:

in response to detecting a second XR equipment in the second physical space, to prevent from viewing by the second XR equipment the first virtual display;

to determine that the second XR equipment has interacted with content associated with the first virtual display; and in response to the determining that the second XR equipment has interacted with the content, to generate for viewing by the second XR equipment the first virtual display.

* * * * *